US006445969B1

(12) United States Patent
Kenney et al.

(10) Patent No.: US 6,445,969 B1
(45) Date of Patent: Sep. 3, 2002

(54) STATISTICAL PROCESS CONTROL INTEGRATION SYSTEMS AND METHODS FOR MONITORING MANUFACTURING PROCESSES

(75) Inventors: Jim Kenney, Yorba Linda; John Leon, Anahem Hills, both of CA (US)

(73) Assignee: Circuit Image Systems, Orange, CA (US)

( * ) Notice: Subject to any disclaimer, the term of this patent is extended or adjusted under 35 U.S.C. 154(b) by 0 days.

(21) Appl. No.: 09/005,259

(22) Filed: Jan. 9, 1998

Related U.S. Application Data

(60) Provisional application No. 60/034,867, filed on Jan. 27, 1997.

(51) Int. Cl.[7] .............................................. G06F 19/00
(52) U.S. Cl. ........................ 700/108; 700/28; 700/51;
700/52; 700/110; 700/117; 700/121; 702/82;
702/83; 702/84; 702/180; 702/181; 702/179;
29/566.1; 29/566.3; 29/564.7; 29/739; 29/564.11;
29/33 M
(58) Field of Search .............................. 700/28, 29, 30,
700/31, 32, 50–51, 52, 95, 96, 108–110,
117, 121; 702/82, 83, 84, 179–181; 29/564.11,
739, 566.1, 564.7, 33 M

(56) References Cited

U.S. PATENT DOCUMENTS

| 3,751,647 | A |   | 8/1973  | Maeder et al. ........... 713/401 |
|-----------|---|---|---------|----------------------------------|
| 4,454,585 | A |   | 6/1984  | Ele ............................ 382/150 |
| 4,571,685 | A |   | 2/1986  | Kamoshida ................. 700/108 |
| 4,875,002 | A |   | 10/1989 | Sakamoto et al. ......... 324/73.1 |
| 4,901,242 | A |   | 2/1990  | Kotan ........................ 700/108 |
| 4,907,167 | A | * | 3/1990  | Skeirik ........................ 700/28 |
| 5,086,397 | A |   | 2/1992  | Schuster et al. ........... 700/110 |
| 5,105,362 | A |   | 4/1992  | Kotani ....................... 700/108 |
| 5,111,404 | A |   | 5/1992  | Kotani ....................... 700/108 |
| 5,149,776 | A | * | 9/1992  | Kushi et al. ................ 430/288 |
| 5,150,289 | A | * | 9/1992  | Badavas ....................... 700/51 |
| 5,238,554 | A | * | 8/1993  | Banks ......................... 205/125 |
| 5,355,320 | A | * | 10/1994 | Erjavic et al. .............. 700/121 |
| 5,408,405 | A |   | 4/1995  | Mozumder et al. .......... 700/31 |
| 5,496,432 | A | * | 3/1996  | Sumi et al. ................. 156/344 |
| 5,539,752 | A |   | 7/1996  | Berezin et al. ............. 714/724 |
| 5,544,256 | A | * | 8/1996  | Brecher et al. ............. 382/149 |
| 5,590,455 | A | * | 1/1997  | Kato et al. ................. 29/564.1 |
| 5,620,558 | A | * | 4/1997  | Hanson et al. ................ 216/95 |
| 5,620,612 | A | * | 4/1997  | Kukanskis et al. .......... 216/18 |
| 5,723,798 | A | * | 3/1998  | Cole et al. ................. 73/865.9 |
| 5,738,776 | A | * | 4/1998  | Florio et al. ................ 205/118 |
| 5,747,098 | A | * | 5/1998  | Larson ......................... 427/58 |
| 5,838,567 | A | * | 11/1998 | Boggio, Jr. ................. 700/121 |
| 5,858,257 | A | * | 1/1999  | Naitoh ........................ 216/92 |
| 5,893,983 | A | * | 4/1999  | Konrad et al. ................ 216/91 |
| 6,017,143 | A | * | 1/2000  | Eryurek et al. ............... 700/28 |
| 6,179,954 | B1| * | 1/2001  | Kawana et al. ............. 156/345 |

* cited by examiner

Primary Examiner—Ramesh Patel
(74) Attorney, Agent, or Firm—Knobbe, Martens, Olson & Bear LLP

(57) ABSTRACT

A method and system for monitoring process parameters associated with a manufacturing or testing process. The system includes: at least one machine which is used in the manufacturing or testing process; at least one sensing device, coupled to the at least one machine, for measuring a process parameter associated with the at least one machine; and a controller, coupled to the at least one sensing device, for receiving and storing measured data from the at least one sensing device. The method includes the acts of: measuring a value of a process parameter associated with a machine used in the manufacturing or testing process; converting the measured value of the process parameter into a digital data signal having a specified data format; transmitting the digital data signal to a controller; and storing the digital data signal in a database.

3 Claims, 12 Drawing Sheets

STATISTICAL PROCESS CONTROL INTEGRATION SYSTEMS AND METHODS FOR MONITORING MANUFACTURING PROCESSES

RELATED APPLICATION

This application claims priority on U.S. provisional application Ser. No. 60/034,867, filed Jan. 27, 1997.

BACKGROUND OF THE INVENTION

1. Field of the Invention

The present invention relates to monitoring parameters associated with manufacturing processes. More particularly, the present invention relates to automatically measuring and storing parameters related to the printed circuit board (PCB) manufacturing process.

2. Description of Related Technology

Printed circuit boards are currently manufactured at a number of sites in a number of countries. Although PCB manufacturing might be arguably a "mature" industry, the conventional manufacturing procedures do not solve the current demands for lower cost and higher quality printed circuit boards.

By way of specific example, during one step of PCB manufacturing common to a plethora of manufacturing sites, a resist layer is laid on top of the surface of a copper panel. In order to provide adequate protection to the underlying copper substrate during a subsequent etching phase, the resist must conform to the surface topography of the copper such that there are no voids or areas in which the resist does not protect the copper. FIG. 1A illustrates ideal conformation between the surface of a copper panel 10 and a resist 12. Note that there are no voids, or air pockets, between the resist 12 and the surface of the copper panel 10. While the conformation shown in FIG. 1A is the goal of all manufacturing sites, FIG. 1B, however, shows a more typical conformation which is achieved between a resist 12 and the copper panel 10. As can be seen in FIG. 1B, air is entrapped between the resist 12 and the surface of the copper panel 10, thereby forming interfacial voids 14. During the following etching process, the etchant solution seeps under the resist 12 where interfacial voids 14 are located and attacks the copper which should have been protected by the resist 12. After etching is complete, a conductive trace is either narrowed or broken because of the attack which occurred at the interfacial void 14 during etching.

SUMMARY OF THE INVENTION

The preferred embodiment of the present invention provides a system and method for automatically monitoring the manufacture of printed circuit boards and automatically monitoring the critical PCB process parameters within quality control limits. However, it is understood that the method and system of the invention may be utilized in other areas of technology which requires the collection, monitoring and/or analysis of statistical data. The science of statistics relates to the gathering of data, or numerical values, for purposes of analysis in order to ascertain numerical facts. The present invention provides a statistical process control integration system (SPCIS) in which monitored machinery associated with various manufacturing and/or testing processes are coupled to a central controller which receives measured process parameters and stores this data. The controller may also run the protocol for data measurement and transmission from each piece of machinery to the controller. The measured process parameters may serve as certifiable data within the process which can be systematically downloaded into a text or other suitable format approved by the International Standardization Organization (ISO), for example, for quality assurance certification. The SPCIS of the invention can also allow the measured parameters to be stored in a memory such that historical information related to the manufacturing process may be saved. Additionally, the SPCIS can notify manufacturing and/or engineering personnel of pending problems, or lack thereof, on a real-time basis.

The invention also provides a method and system, or network, for interconnecting multiple, remotely located, PCB manufacturing sites such that these remotely located processes may be monitored in a coordinated fashion. By utilizing computer-based networks such as a local area network (LAN) and/or a wide area network (WAN), or the global computer information network, otherwise known as the "Internet," a system operator at a remote location can access an SPCIS server computer and perform monitoring functions and access data as if that system operator were physically in the room where the SPCIS monitoring equipment are located. Therefore, the invention also provides an automatic and computerized system which can electronically link multiple remote sites in order to efficiently monitor process parameters at each of the remote sites and correlate the measured data such that an accurate record of each PCB, or batch of PCBs, and the corresponding process parameters measured during the manufacture of the PCBs can be maintained.

The systems and methods of this invention provide significant advantages. Typically, under prior art monitoring techniques, a human operator manually measures a specific set of parameters and records these measured values into a log book. This process is tedious and time-consuming. As human resources are limited, the monitoring and maintenance of the various process parameters described above can not be frequently performed using this prior art, manual method. Depending on the human resources of a particular company, only a select few of these process parameters are typically measured. Additionally, they are measured and recorded on an infrequent basis (e.g., daily, weekly or even monthly).

Often times, if a process parameter is not within specified limits, it is detected only after many PCBs have been manufactured defectively. These defective PCBs typically need to be reworked or, if the damage is too extensive, discarded entirely. This leads to a waste in materials, time and resources of the company. Additionally, since manufacturing process parameters are not frequently monitored, real-time alarms and displays which warn a system operator of out-of-tolerance parameters are not provided by the prior art systems. If a process parameter is out of tolerance, there is no alarm or way of notifying a quality control engineer until the out of tolerance process parameter is detected by an operator whose job is to manually perform routine measurements of the process parameters at intermittent time periods. By the time the out of tolerance process parameter is detected, many defective PCBs may have already been manufactured.

A feature of this invention is that it provides an efficient and automated method and system for monitoring process parameters related to the PCB manufacturing process such that desired process parameters may be frequently monitored in order to provide real-time alarms which may notify an operator as soon as an out of tolerance parameter is detected. Additionally, this invention provides an automatic method and system for recording and storing measured process parameters such that an accurate history of the conditions under which a particular batch of PCB's are manufactured may be maintained. By providing a record of values of measured process parameters which correspond to each batch of PCBs, a manufacturer can provide quality control data to customers for each batch of PCBs.

With the emergence of a world-wide global economy, many PCB manufacturers have an international client base. For these manufacturers, PCBs that are manufactured and sold in the United States, and in other countries, must meet quality control specifications promulgated by organizations such as the International Standardization Organization (ISO). The ISO requires that with each shipment of PCBs, a certified record of the quality control tests and their results related to each batch of PCBs be included. With such requirements by organizations such as the ISO, it is now more important than ever to provide an efficient, comprehensive and reliable method and system for monitoring the process parameters of the PCB manufacturing process. The present invention eliminates the need for tedious manual measurement and recording of parameters associated with the statistical process control procedures of the prior art.

Additionally, prior art PCB manufacturing methods do not provide any way of efficiently consolidating and organizing the measured process parameters into a comprehensive and meaningful format for enabling a customer, or other end user, to quickly view and evaluate the conditions under which a given batch of PCBs were manufactured. This invention provides a method and system for automatically consolidating, correlating and organizing measured process parameters in order to present the data in a format which is meaningful and easy to understand. For example, measured temperature values may be represented by a historical bar graph which may be quickly and easily viewed by a system operator.

Another significant feature of one embodiment of the invention is an automated and computerized system which may link multiple remote sites in order to efficiently monitor the process parameters at each of the remote sites and correlate the measured data such that an accurate record of the batch number of the PCBs, the location of the manufacturing site, the values of the process parameters taken from each site, etc. can be maintained. Prior art methods do not accommodate a systematic and coordinated method of monitoring and measuring process parameters at these different locations. Often times, when a company has several manufacturing plants or sites, it is difficult to monitor the above-identified process parameters and maintain quality control over the manufacturing processes at each of the sites. Prior art methods require a separate operator to measure and record these parameters at each of the sites. However, this invention makes it now possible to link many remote manufacturing sites such that data may be communicated between multiple remote sites and a central computer, or server, which can process and store the data. Prior art statistical process control systems do not integrate multiple remote process sites so as to monitor the remote sites in a coordinated fashion.

OVERALL DESCRIPTION OF THE INVENTION

Figure 2:
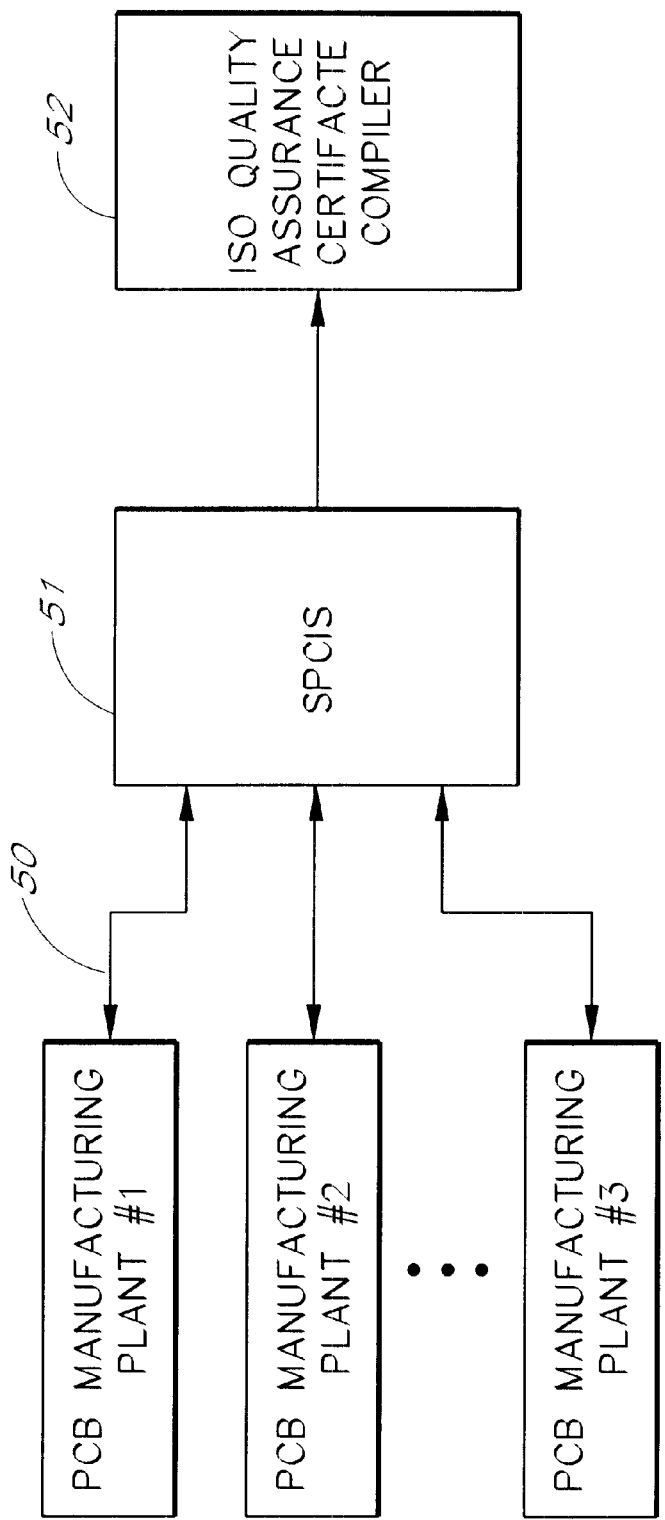
FIG. 2 illustrates a functional block diagram in which several PCB manufacturing plants are coupled to a single SPCIS monitor and ISO quality assurance certification compiler.

This invention provides a method and system for automatically monitoring and validating, in real time, the process parameters related to the manufacturing of printed circuit boards at a plurality of PCB manufacturing sites. Referring to FIG. 2, PCB Manufacturing Plant 1, PCB Manufacturing Plant 2, and PCB Manufacturing Plant 3 represent manufacturing sites at different locations. These sites may be in as close as the same building or geographically as far apart as being in different parts of the globe.

As described below, the process parameters at each site are measured and, after being converted into an appropriate digital format, are sent over digital communication path 50 to a SPCIS (statistical process control integration system) 51 The SPCIS 51 stores preset process parameters and compares these preset values with the digital signal received over this path 50 and may automatically provide a readout alerting of an out-of-tolerance parameter.

The system of this invention provides a number of significant advantages. The SPCIS 51 provides for monitoring all of the parameters which are critical to mass production of printed circuit boards. The SPCIS 51 enables only a single or at most a few individuals to constantly monitor the quality of boards being conducted at a number of different PCB manufacturing plants.

One additional advantage, shown in FIG. 2, is the ISO Quality Assurance Certificate Compiler 52 coupled to the SPCIS monitor 51. As discussed below, the accurate making and retention of records showing the history of the manufacture of each PCB board provides compliance with the quality control standards specified by organizations such as the ISO. In one embodiment, the ISO certificate compiler 52 may include a database within a programmable logic controller of the SPCIS 51. The programmable logic controller retrieves measured parameter values and stores these values in the database in accordance with a specified format which is in compliance with ISO standards.

The PCB Manufacturing Plant

Figure 3:
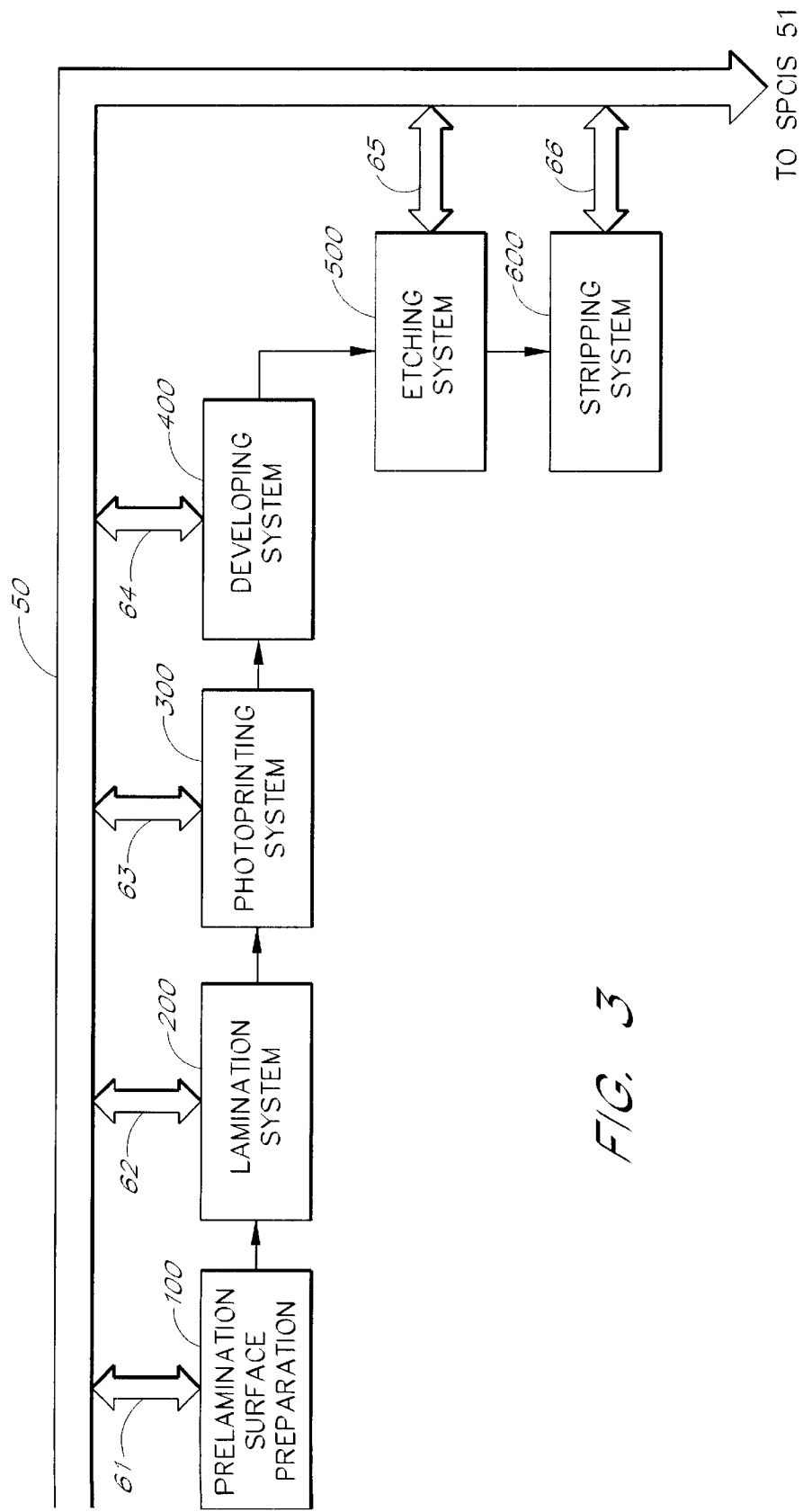
FIG. 3 illustrates a functional block diagram of several stages of a PCB manufacturing plant.

The PCB Manufacturing Plant of FIG. 2 is shown in greater detail in FIG. 3. During a PCB manufacturing process, process steps must occur to produce a finished product. These processes are conducted in stages including the prelamination surface preparation stage 100, the lamination system 200, photoprinting stage 300, the developing system 400, the etching system 500, and the stripping system 600. As shown, each of the PCB manufacturing stages 100, 200, 300, 400, 500, and 600 are coupled to the SPCIS 51 shown in FIG. 2 by means of bidirectional communication links 61, 62, 63, 64, 65 and 66, respectively. As is described in further detail below, the SPCIS 51 not only receives measured parameter values from each of the various stages of the PCB manufacturing process, but may also communicate data and/or commands to the various process machinery in order to initiate or control the taking of data by the various machines.

Typically, a first phase of the PCB manufacturing process involves a prelamination surface preparation phase performed in stage 100, in which the surface of a copper panel is cleaned and/or scrubbed in order to optimize the topography of the surface for subsequent lamination by a photoresistive film (resist). As described in further detail below, the copper panel ultimately forms a layer of the PCB. The prelamination surface preparation phase typically involves scrubbing the surface of the copper panel with a brush or similar device. A common type of brush which is used for this purpose is known in industry as a pumice brush which is made from an abrasive material used to scrub the surface of the copper panel. The pumice brush is effective in both cleaning as well as structuring the surface of the copper panel to remove undesired surface irregularities. Although the following description focuses on a panel made form copper, it is understood that panels made from other types of metals/alloys may be utilized in accordance with the invention.

The copper panel is transported into a scrubbing chamber wherein it is automatically scrubbed by the pumice brush which exerts a downward force onto the surface of the copper. In order to provide adequate cleaning and structuring of the surface without overly scrubbing the surface so as to damage the copper, the brush should exert a proper pressure or force onto the surface of the copper panel and the copper panel should remain under the brush for a sufficient length of time. Therefore critical process parameters during this scrubbing phase are the pressure applied by the brush and the speed of the conveyor system which transports the copper panel under the brush.

An alternative, or additional, step of the prelamination surface preparation phase often involves washing the surface of the copper panel with either an aluminumoxide spray, a pumice spray, an acid or alkaline-based cleaning solution, or alternatively, with a microetchant solution. The different types of solutions which may be used to wash the surface of the copper panel during the prelamination surface preparation phase are well-known in the art. The cleaning solutions prepare the surface of the copper by removing organic residues (e.g., grease) and other residues such as copper oxide and/or chromates. During this washing process, the copper panel is typically transported via a conveyor system through a cleaning chamber in which the surface of the copper panel is sprayed with the cleaning solution. In this process, the temperature of the solution and the pressure under which it is sprayed onto the board are important process parameters which affect the efficiency of the cleaning solution in removing undesired residues from the copper surface. Also, the speed of the conveyer system should be set such that the copper panel is sprayed with the cleaning solution for an adequate duration of time in order to ensure proper cleaning.

After the prelamination surface preparation phase has been completed, the copper panel is ready to enter the lamination phase performed by the lamination system 200 in which a photoresistive film (resist) is laminated onto the surface of the copper. The purpose of laminating the resist onto the copper surface is to protect desired portions of the copper during a subsequent etching phase in which undesired portions of the copper panel are etched away, or removed, leaving only the copper that forms the desired circuitry or layer of the PCB. The etching phase is described in further detail below.

During the lamination process, a resist is typically cut from a spool or roll of photoresistive material so as to match the size of the copper panel. Resists are commercially available in a variety of thicknesses, widths and lengths (e.g., a 100 ft. roll of Dupont 9413 resist material having a specified thickness and width). After a piece of resist is cut to a specified size, it is then laid on top of the surface of the copper panel and the resist/copper panel assembly is then inserted into a laminator, typically having two nip rollers which apply heat and pressure to press and conform the resist onto the surface of the copper panel. Lamination involves a controlled application of heat, pressure and speed (i.e., the length of time exposed to the temperature and pressure) to make the resist achieve a viscosity such that it is fluid enough to coat and flow into the microstructures of the copper surface. The principal of lamination, therefore, is to create flow of the resist so that it may make intimate contact with the copper surface. Flow rate is directly proportional to the pressure applied and inversely proportional to the viscosity of the medium.

Typically, the pressure applied by the nip rollers results from the weight of the rollers and a pneumatic assist pressure applied to the rollers. During the lamination step, the resist travels between the nip rollers. The heat of the rollers makes the film almost liquid and the pressure of the rollers forces the viscous liquid into the surface topography of the copper panel. For a given roller diameter, the roller speed determines how long the panel is exposed to the heat and pressure of the nip rollers.

Figure 1A:
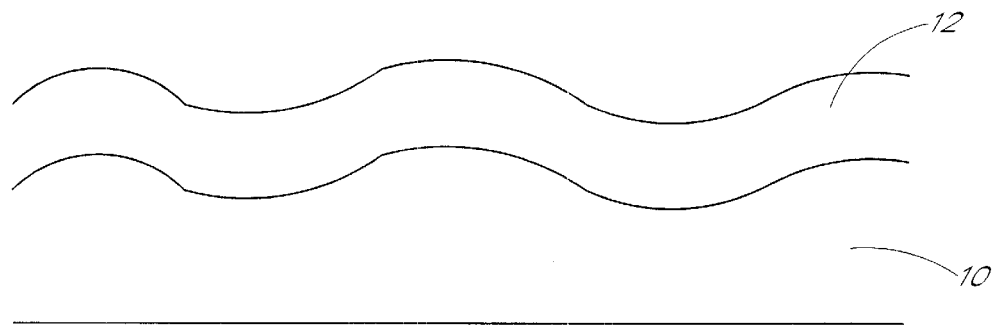
FIG. 1A illustrates ideal conformation between a resist and a copper substrate.
Figure 1B:
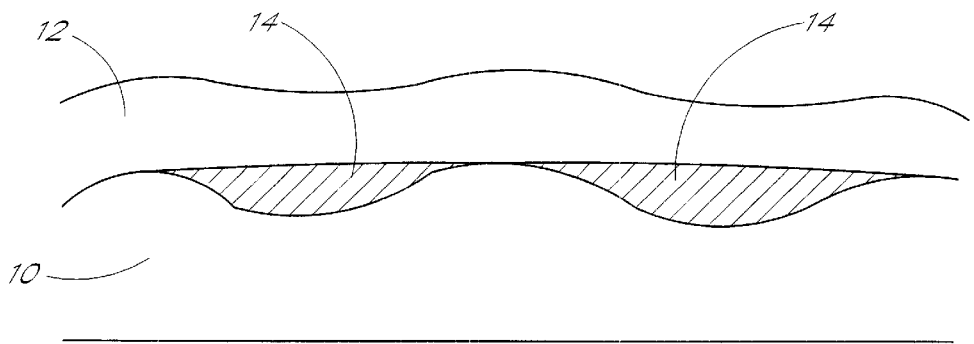
FIG. 1B illustrates a typical, non-ideal level of conformation between a resist and a copper substrate.

Therefore, as described above with reference to FIGS. 1A and 1B, the goal during lamination is to have good conformation between the resist 12 and the surface of the copper substrate 10 in order to eliminate interfacial voids 14. Optimization of various lamination parameters can improve resist conformation to the surface of the copper panel 10. The following are some of the process parameters, or variables, which affect resist conformation to the copper surface: (1) the pressure or force applied by the lamination rollers; (2) the speed at which the resist and copper panel are transported through the rollers; (3) the temperature of the rollers; (4) resist thickness; and (5) preheating of the resist. For example, the amount of pressure applied to compress the resist 12 onto the copper surface 10 dictates whether the resist 12 is driven into voids, valleys, and other defects or surface irregularities of the copper surface 10. The temperature of the nip rollers dictates the viscosity of the film as it is compressed into the surface of the copper panel 10. If the resist 12 is not hot enough, it will not conform well to the surface topography of the copper. On the other hand, if the temperature of the resist 12 is too hot, the monomer-based resist 12 will start to transform into a polymer which is a harder substance that possesses poor conformation qualities. The roll speed of the nip rollers determines the amount of time that the resist 12 and the copper panel 10 are exposed to the pressure and temperature of the rollers.

Another phase of the PCB manufacturing process is the artwork generation, or PCB circuit layout design phase. The building of a printed circuit board really starts with an engineer designing the circuit, i.e., deciding what functions that board will perform, what electronic components will be needed, and how they will be interconnected. The end product of this stage is a schematic, which illustrates a functional design. From the schematic, a board designer will convert the symbols into locations for circuit components and decide how to efficiently place them on a board of the required dimensions in a way that permits conductive traces to connect these components properly. During this process, the number of layers that will be required and the functions performed on each layer are determined. Although this step is frequently done manually, computer programs are also used to assist in the process. The "artwork" is typically an accurately scaled drawing of the conductive traces that will be implemented in the PCB.

The duplicates made from an artwork master are usually referred to as the "working phototools" or simply "phototools." These are the films which are used in the resist exposure step which is described in further detail below. Phototools can be produced on silver halide or diazo film or glass plates. Creating an accurately sized, defect-free phototool is an important step in PCB manufacturing. During the artwork generation phase, a piece of raw film, which contains light-sensitive emulsion particles is exposed to light which hits the emulsion particles and changes the chemistry of the film. The light, typically a laser light, is applied to the film in a specified pattern which corresponds to the desired circuit, or the negative of the circuit, to be formed on the PCB. When the light hits the emulsion particles the exposed film typically darkens as a result. The process of artwork generation, and the corresponding phototools produced, are well-known in the art. Similarly, the various types of photo sensitive films, and their characteristics, are also well-known in the art. Therefore, a further description of this phase of the PCB manufacturing process is not given here.

After a phototool has been generated, the copper panel/resist assembly (assembly) is now ready for the photoprinting phase performed in photoprinting stage 300. In this phase the phototool is placed on top of the resist which has been laminated onto the copper panel and the entire assembly is then placed into a pressurized exposure chamber of a photoprinting machine. In the exposure chamber, a vacuum pressure, typically 0–30 Hg, is applied so that the phototool is compressed against the resist. The vacuum pressure must be sufficient to adequately compress the phototool against the resist such that an accurate pattern may be formed on the resist when it is subsequently exposed to UV radiation in the exposure chamber. It is appreciated, that the closer the phototool is pressed against the resist, the better the resolution of the pattern that is formed, or exposed onto the resist, by subsequent UV radiation onto the assembly.

The UV light exposure or polymerization step objective is to accurately and reliably transfer the image produced by the artwork to the photo-sensitive resist which has been laminated onto a copper panel. Also, exposure increases adhesion of the resist to the copper panel. Image transfer is accomplished by bringing the phototool into close contact with the panel and exposing the resist with ultraviolet (UV) light. The darkened, or opaque, areas of the phototool will not allow UV radiation to pass and expose the underlying resist. Only the clear areas of the phototool will allow the underlying resist to be exposed by the UV radiation. Depending on the type of resist used, and its thickness, in order for proper exposure to occur, the exposed areas of the resist must be radiated by the UV light at a proper dosage. Therefore, depending on the particular characteristics of the resist, UV light exposure should be at a proper intensity and for a specified duration of time in order to achieve the best resolution. When the resist is exposed to the UV light in this manner, the exposed areas of the resist polymerize and harden. These polymerized regions of the resist are then able to withstand contact with a developing solution which breaks down and removes the unpolymerized, or unexposed, portions during a developing phase. The developing phase is described in further detail below.

As discussed above, some of the process parameters which affect the photoprinting phase, otherwise known as the exposure phase, of the PCB manufacturing process are: vacuum pressure within the exposure chamber, the intensity of the UV radiation, and the duration of time in which the resist is exposed. Therefore it is desirable to measure and monitor these process parameters during the photoprinting phase in order to ensure the quality of the resultant PCB product.

After the photoprinting phase, the assembly enters into a developing phase performed in the developing system 400 in which the phototool is peeled away from the resist and the subsequent assembly is then sprayed with a developing solution, in order to remove unexposed resist material from the copper panel. Typically, the assembly is transported via a conveyor system through a developing chamber wherein the assembly is sprayed by the developing solution. The developing machine is set at a proper conveyorized speed so that the correct "development time" and development "breakpoint" are achieved. "Breakpoint" is defined as the location within the usable developer chamber where unpolymerized (unexposed) resist from the substrate is removed from the substrate. "Development time" is the real time in the usable developer chamber when the conveyor speed is correctly set to get the proper breakpoint. The time required to remove or develop unpolymerized resist from the substrate is typically prescribed for each type of resist for given thicknesses of the resist. By knowing this time-to-clean ($T_c$), an operator can calculate the desired conveyor speed with reference to the length of the developer chamber so as to achieve a breakpoint at a proper location within the chamber.

Some of the process parameters which affect the developer solution's ability to remove or clean away unwanted, unexposed portions of the resist are: the pH of the solution; the concentration of the solution; the temperature of the solution; the pressure at which the developer solution is sprayed onto the assembly, and the speed of the conveyor belt which carries the assembly under a pressurized nozzle which sprays the developer solution onto the assembly.

Typical developer solutions comprise sodium carbonate monohydrate, or potassium carbonate. Additionally, properietary developer solutions such as sodium or potassium hydroxide are also available. In order to control their pH levels, or concentration levels, these solutions are mixed with water in order to provide a diluted solution. The pH of the developer solution determines the activity level of the solution in breaking down unexposed resist. If the pH is too low, the solution will not be active enough to break down the unexposed resist at the desired breakpoint. Conversely, if the pH is too high, the solution will clean rapidly but will also break down the hardened, exposed resist which is needed to protect the underlying copper in the subsequent etching process. Therefore, it is important to measure and monitor the pH level of the developer solution such that it is not too low nor too high. A typical range for the pH is 10.2–11.5. Similarly, if the concentration level of the developer solution is too low or too high, the solution will break down the resist either too slowly or too rapidly, leading to similar problems as those described above with respect to the pH level.

The temperature of the developer solution also affects the activity level of the solution. If the temperature of the solution is too low, the developer solution will not be active enough and if the temperature of the solution is too high, the developer solution will be too active, resulting in the adverse side effects as described above with respect to the pH of the solution. The temperature is typically maintained in the range of 80° F. to 95° F.

The pressure at which the developer solution is sprayed onto the photoresist also has a great impact on breaking down and removing the unexposed resist from the copper panel. And of course, the speed of the conveyor belt which carries the assembly through the developing chamber determines the length of time that the resist is exposed under the pressurized nozzle which sprays the developer solution onto the assembly.

In order to effectively monitor the developing phase of the PCB manufacturing process, it is desirable to measure and monitor the above-identified process parameters at relatively frequent intervals. By frequently and consistently monitoring and maintaining these process parameters within specified ranges, the developing process may be controlled such that optimum, or near optimum, developing of the resist occurs for each batch of PCBs.

After the assembly has completed the developing stage of the PCB manufacturing process, the assembly then enters into a first rinse stage wherein the developer solution residue and any remaining unexposed resist is rinsed and cleaned from the copper panel. Typically, during developing, 90–95% of the unexposed resist is removed from the copper panel. The remaining 5–10% of resist is called "scum" in the PCB manufacturing industry. In order to provide a proper rinse, in which excess developer solution and scum is removed from the assembly, the water used to perform the rinse should be maintained at a proper temperature, pressure and have a specified water hardness which is typically measured in parts per million (ppm) of calcium to water. Therefore, it is desirable to frequently measure and monitor these process parameters in order to ensure proper rinsing.

After the rinsing stage, the assembly enters a drying stage in which the water on the assembly is dried by means of pressurized and/or heated air. It is also desirable to monitor the air pressure and temperature at which the assembly is dried.

After the assembly has been rinsed and dried, it then enters into the etching phase performed by the etching system 500. Etching is the removal of copper achieved by a controlled chemical oxidation of the metal and is one of the two major processes that transform the plain surface of copper laminant into a circuit pattern. After the developing stage, if a negative phototool has been used, the remaining resist mimics the circuitry, or interlayer, of a desired printed circuit board. During the etching step, this resist typically covers and protects the copper conforming to the circuit lines or traces. An etchant solution then forms a copper circuit by removing the copper not protected by the resist. It is noted that when a positive phototool is used, the exposed portions of the resist typically correspond to the circuitry and the pads of the desired PCB layer. Therefore, the unexposed portions of the resist are developed out during the developing stage, leaving a resist pattern which is a "negative" of the desired circuitry and pads of the PCB. Whether a negative or positive phototool is used depends upon the process. If an innerlayer process is occurring, the phototool is typically positive. If an outerlayer process is occurring, the phototool is typically negative.

Etching is typically performed by spraying an etchant solution onto the copper panel as it is transported through an enclosed chamber containing a pressurized nozzle which sprays the etchant solution. Spray etching is the most common and preferred method for printed circuit board production since it produces a faster etch rate and is well-suited for large production runs and fine-line work. Spray etching equipment consists of an enclosed spray chamber with a sump for heating and cooling the etchant solution. The solution is pumped through manifolds containing spray nozzles that produce a uniform spray over the width and length of the chamber. The spray manifolds may be aligned on opposite sides of a conveyor system to allow for simultaneous etching of both sides of a copper panel.

Two of the more common methods of etching are acid cupric chloride etching and alkaline etching. In acid cupric chloride etching, important process parameters which affect the etching process are as follows: the normality of chemistry, or concentration, of the acid etchant solution; the temperature of the acid etchant solution; the specific gravity, or baumè, of the etchant solution; and the speed of the conveyor belt which transports the copper panel assembly under the pressurized spray of etchant solution.

For example, hydrochloric acid concentration has a significant affect on the etch rate and "undercut" characteristics of the etchant solution. The term "undercut" refers to the etchant solution's ability to laterally attack copper under the protective resist and is directly related to the etch rate. Higher acid normality produces higher etch rate but also produces greater undercut. Additionally, normalities higher than 3N could be harmful to some photoresists as well as some of the metal components in the etchant pumps. On the other hand, if the acid concentration drops below 0.5N, undesirable chemical reactions such as cuprous chloride precipitation can occur.

The copper content range of the etchant solution is established and maintained to give the best quality etch, including etch factor and smoothness of side walls. The copper content is typically measured by specific gravity which is a measure of the ratio of copper particles to other particles in the etchant solution, typically measured in parts per million (PPM). Another measure of copper content, which is well-known in the industry, is baumè which is a measure of the specific gravity in degrees. Typically, the range for baumè is 28–32° and that for specific gravity is 1.24–1.28. When the copper rises above the desired limit, water is added to lower the concentration (and baumè). Excess chemistry is pumped out as necessary to control the solution level.

The etchant temperature also affects etch rate. An increase of 10° F. produces about a 15% increase in etch rate. Acid cupric etching is fairly slow, and the highest temperature possible is used to obtain a faster etch rate. This upper limit for temperature setting is usually equipment related and seldom runs above 130° F.

The speed of the conveyor belt which transports the copper panel assembly under the pressurized etchant spray, is also critical to providing a clean and precise etch of the desired copper from the panel in order to produce the resultant circuitry. The conveyor speed must be slow enough such that the etchant solution has adequate time to etch away and remove the desired copper material from the copper panel, and yet, must not be so slow as to overly expose the copper panel assembly to the etchant solution. Any extended dwell time of the copper panel assembly under the spray of the etchant solution can cause damage to the resist and begin eating away at the underlying copper which is supposed to be protected by the resist.

We now turn to the second method of etching mentioned above, alkaline etching. In alkaline etching, critical process parameters are: the pH of the alkaline etchant solution, the solution temperature, the conveyor speed, the spray pressure, and the baumè (copper content) of the alkaline etchant solution. These process parameters have a strong impact on the etch rate and the quality of the resulting etched product. The pH range of the alkaline etchant solution is typically maintained at 7.5–8.7.

In both of the above-described etching methods, the conveyor speed is typically maintained such that there is an 80% breakpoint. In other words, when the copper panel assembly has reached a point in time that marks 80% of the total dwell time that the copper panel assembly is in the etchant chamber, all of the desired copper to be etched should be removed and cleaned away from the copper panel assembly.

After the etching process is completed, the assembly is conveyed through rinse chambers where replenishment chemistry and/or water is sprayed to rinse the remaining etchant solution off the panels. This is generally a two-stage process. The first stage of the rinse is often called the replenishment rinse section or "pollution control chamber." It is a partially recirculating spray rinse chamber for the removal of the bulk of the etchant solution, thus reducing copper dragout to the water rinse section. This helps to maintain copper at a low level in the final stage water rinse which aids in waste treatment processes. The first stage contains a fair amount of copper since it removes copper-containing etchant from the board. In order to maintain the copper level below a specified level, replenishment solution or water is added to the first stage rinse solution. In either case, this solution is used as part of the replenishment system for control of the etchant chemistry. The second-stage rinse is a conventional fresh water rinse which is discharged as used. This rinse effluent contains significantly less copper but usually still requires copper removal prior to disposal.

After the post-etch rinsing stage has been completed, the copper panel assembly enters the stripping system 600 in which the polymerized, or hardened, resist is stripped from the remaining copper of the assembly. Operating under the principles of caustic chemistry, the stripping solution, typically sodium hydroxide or potassium hydroxide, or a mixture thereof, is sprayed onto the assembly at a specified pressure and temperature. The stripping solution attacks the adhesion properties of the polymerized resist and breaks down the chemical bonds of the polymer. As a result, the resist starts to swell and break down while being washed away by the pressurized spray of the stripping solution. As described above, it is desirable to measure and monitor the temperature and pressure of the stripping solution in order to ensure a thorough and efficient stripping process. The speed of the conveyor which transports the copper panel assembly under the pressurized spray is also maintained at specified levels so that the stripping solution has adequate time to remove the polymerized resist from the remaining copper circuitry. Typically, the breakpoint of the stripping process is set to a range of 20%–50% of the time that the copper panel assembly remains in the stripping chamber.

After the stripping process, the remaining copper circuitry typically undergoes a final rinse cycle under a pressurized water spray. After this final rinse cycle, the assembly is dried by heated and/or pressurized air. As described above with respect to the previous rinse and dry processes, the pressure of the water rinse, the temperature of the water rinse, as well as the pressure and temperature of the air which dries the assembly after the rinse, may be monitored and maintained within specified limits. The speed of the conveyor belt which transports the assembly under the pressurized rinse and also through the heated air dryer, should also be maintained at a specified level.

Although the various stages of the PCB manufacturing process have been described as one overall process above, it is understood that any given PCB manufacturing site may have one, or more, of the stages described above at that particular site. Additionally, it is not necessary that all of the various processes be performed in any one room or building. For example, dry processes such as lamination and photo-printing may occur in one room, and wet processes such as developing, stripping and etching may occur in another. Furthermore, each stage of the manufacturing process may have an independent transport or conveyor system for transporting PCB assemblies therethrough, or two or more stages may have a common conveyor system. The present invention is not limited to a particular combination or configuration of processes, but is capable of monitoring manufacturing processes in various types of systems.

DETAILED DESCRIPTION OF THE INVENTION

The Prelamination Surface Preparation Phase

Figure 4:
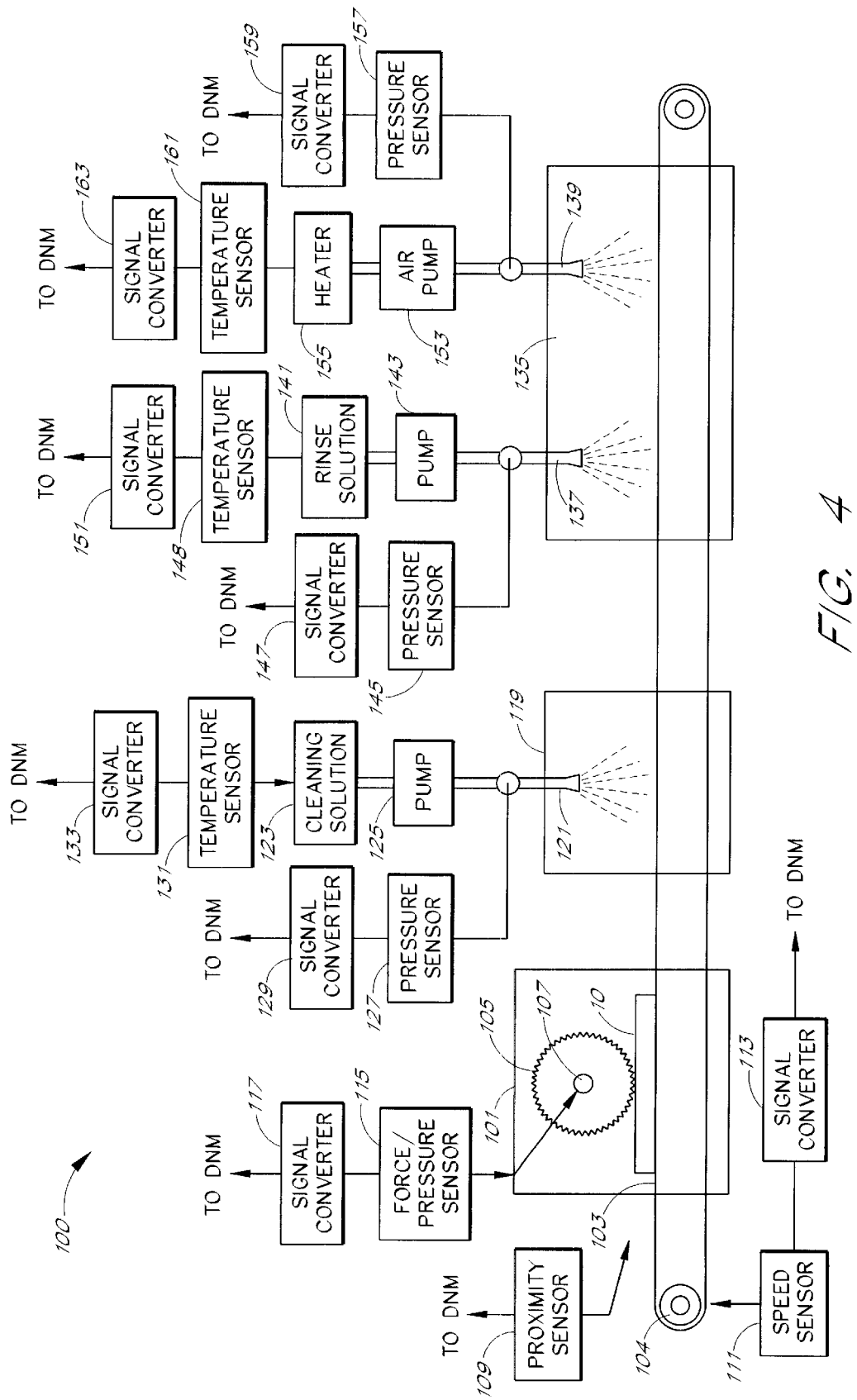
FIG. 4 illustrates a functional diagram of one embodiment of a preclean/scrubbing system having sensors coupled thereto for monitoring process parameters associated with the preclean/scrubbing process in accordance with the invention.

Referring to FIG. 4, a functional diagram of one embodiment of a preclean/scrubbing system 100 which may be implemented in the statistical process control integration system (SPCIS) of the present invention, is shown. The preclean/scrubbing system 100 includes a scrubbing chamber 101 through which a copper panel 10, which ultimately forms a layer of a PCB, is transported by a conveyor 103 at a specified speed. The scrubbing chamber 101 includes a scrubber brush 105 which rotates about an axis 107 in order to scrub a top surface of the copper panel 10. The scrubber brush 105 exerts a downward force, or pressure, onto the surface of the copper panel 10 so as to clean the surface of the copper panel 10. The scrubber brush 105 may be any type of brush which is commonly used in the art. A common type of brush which is used during the scrubbing process is a pumice brush.

Located adjacent to the conveyor belt 103 is a proximity sensor 109 which detects when a copper panel 10 has been transported to a specific location with respect to the scrubbing chamber 101. In one embodiment, the proximity sensor 109 is an Omron E2E inductive proximity sensor which detects the magnetic inductance of the copper panel 10 in order to ascertain its presence. Such types of proximity sensors are well-known in the art and are readily and commercially available. Upon detecting that the copper panel 10 has entered the vicinity of the scrubbing chamber 101, the proximity sensor 109 generates an event trigger signal and sends this signal to a Device Net Master (DNM) Module, otherwise known as the "master module" herein. The master module receives and identifies the trigger signal and thereafter transmits the trigger signal to a controller of the SPCIS. Upon receiving this trigger signal, the controller will initiate a data gathering protocol which instructs specified sensors, coupled to the scrubbing chamber 101, to take measurement readings and transmit the measured values to the controller. The operation of the controller, as well as the master module, is described in further detail below with reference to FIG. 10.

Coupled to the conveyor belt 103 is a roll speed sensor 111 for measuring and monitoring the roll speed of the conveyor belt 103. In one embodiment, the roll speed sensor 111 is an Omron E2E proximity sensor which detects the magnetic inductance produced by the teeth or spokes of a rotating wheel, or drive sprocket 104, which drives the motion of the conveyor belt 103. The Omron sensor 111 counts the passing of each tooth or spoke of the sprocket 104 as it rotates, and converts the "ticks" produced by each tooth of the sprocket 104 into digital pulses which are then transmitted to a signal converter 113 that converts the digital pulses into a digital signal having a specified data format. This specified data format may be in conformance with a standard communication protocol such as the DeviceNet™ communication protocol developed by the Open DeviceNet Vendor Association, Inc. (ODVA). DeviceNet is a low-cost communications link to connect industrial devices such as limit switches, photoelectric sensors, valve manifolds, motor starters, process sensors, bar code readers, etc. to a network. The digital signal produced by the signal converter 113 is then sent to the DNM module. As is explained in greater detail below with reference to FIG. 10, the DNM, otherwise known as the master module, receives and interprets all the data from the various sensors which are coupled to the various process machinery being monitored. After the master module has received and identified a process parameter, it then transmits the received data to a controller of the SPCIS for processing and/or storage thereby.

Coupled to the scrubber brush 105 is a force/pressure sensor 115 which measures a downward force, or pressure, exerted by the brush 105 onto the top surface of the copper panel 10. In one embodiment, the pressure sensor 115 is an Ashkroft pressure sensor, model no. K1, manufactured by Ashkroft, Inc. of Stratford, Conn. The Ashkroft pressure sensor measures the pounds per square inch (psi) exerted by the brush 105 onto the copper panel and outputs a 4–20 milliamp (ma) signal which is proportional to the measured pressure within a specified range of pressure values. The 4–20 ma signal is then transmitted to a signal converter 117 which converts the 4–20 ma signal into a digital signal having a specified data format. In one embodiment this data format is a sixteen-bit data word wherein a specified number of bits represent information pertaining to the measured process value and another set of bits represent identification data which may indicate the specific process parameter being measured or the specific sensor through which the parameter is being measured. The signal converter 117 then sends the digital signal to the master module.

As used herein, the term "signal converter" refers to any type of electronic device which is capable of receiving an input signal, either analog, digital or pulse signals, for example, and converting the input signal into a desired output signal, which may be either an analog, digital, or pulse output signal. For example, in one embodiment, the signal converter 113 which is coupled to the speed sensor 111 may receive pulse signals from the speed sensor 111 and converts these pulse signals into a digital output signal having a specified data format. Signal converters of this type are well-known in the art. As another example, in one embodiment, the signal converter 117 which is coupled to the force/pressure sensor 115, receives a 4–20 ma analog input signal and converts this signal into a digital output signal having a specified data format. Analog to digital signal converters of this type are also wellknown in the art.

As shown in FIG. 4, the preclean/scrubbing system 100 also includes a cleaning chamber 119 through which the copper panel 10 is transported by the conveyor 103. The cleaning chamber 119 includes a pressurized nozzle 121 which sprays a cleaning solution from a cleaning solution reservoir, or sump 123. A fluid pump 125 pumps the cleaning solution from the reservoir 123 to the nozzle 121. A liquid pressure sensor 127 is coupled to the pressure nozzle 121 located within the cleaning chamber 119. The pressure sensor 127 monitors the in-line pressure at which the cleaning solution is sprayed onto the copper panel 10 in order to effectively clean away any dirt, deposits or other types of residues which may be present on the surface of the copper panel 10. In one embodiment, the pressure sensor 127 is an Omega Linear Current Output Pressure Sensor, manufactured by Omega, Inc., located in Stamford, Conn., which measures the in-line liquid pressure in the nozzle 121 and converts the measured pressure value into a linear current output. In one embodiment, the linear current output is in the range of 4–20 ma and varies proportionally with a given pressure range, for example, 0–300 psi. This 4–20 ma signal is then sent to a signal converter 129 which converts the analog signal into a digital signal having a specified data format. This digital signal is then sent to a master module for further processing as mentioned above.

A temperature sensor 131 is coupled to the cleaning solution reservoir 123. In one embodiment, the temperature sensor 131 is an Omron E5CK/E5EJ temperature sensor, manufactured by Omron, Inc. of Shaumburg, Ill., which measures the temperature of the cleaning solution and generates an output current that is proportional to the measured temperature value. In one embodiment, the temperature sensor 131 will generate an output current in the range of 4–20 ma which is proportional to a measured temperature value in the range of 95° C.–135° C. This 4–20 ma signal is then sent to a signal converter 133 which converts the analog signal into a digital signal having a specified data format. This digital signal is then sent to the master module.

It is appreciated that the temperature of the cleaning solution and the pressure at which it is sprayed onto the surface of the copper panel has a significant impact on the effectiveness of the cleaning process as the copper panel 10 is transported through the cleaning chamber 119 at a specified rate by the conveyor belt 103. Therefore, it is important to properly set the temperature and pressure of the cleaning solution such that adequate cleaning is accomplished during the period of time when the copper panel 10 is present in the cleaning chamber 119. Additionally, since the period of time that the copper panel spends in the cleaning chamber 119 is controlled by the roll speed of the conveyor 103, it is also important to properly set and monitor the conveyor speed.

Rinse and Dry Phase

After the copper panel 10 has completed its journey through the cleaning chamber 119, it is then transported through a rinse and dry chamber 135 having a first pressurized nozzle 137 for spraying a rinse solution onto the copper panel 10 and a second pressurized nozzle for blowing air onto the copper panel 10 in order to dry the copper panel 10. The nozzle 137 sprays a rinse solution from a rinse solution reservoir 141 by means of a liquid pump 143. The rinse solution may be one of many kinds of solution known in the art and in one embodiment, is simply fresh water. Coupled to the nozzle 137 is a pressure sensor 145 for measuring the in-line pressure of the rinse solution. A signal converter 147 is coupled to the pressure sensor 145. The pressure sensor 145 and the signal converter 147 may be identical to the pressure sensor 127 and the signal converter 129 as described above. Therefore, a further explanation of their operation need not be given here. A temperature sensor 149 is coupled to the rinse solution reservoir 141 and a signal converter 151 is coupled to the temperature sensor 149. The temperature sensor 149 and the signal converter 151 may be identical to the temperature sensor 131 and the signal converter 133. Therefore, a further explanation of their operation need not be given here.

Coupled to the second pressurized nozzle 139, is an air pump 153 which pumps out heated air from a heater 155 through the nozzle 139. A pressure sensor 157 is coupled to the nozzle 139 and a signal converter 159 is coupled to the pressure sensor 157. Also shown in FIG. 4 is a temperature sensor 161 coupled to the heater 155 and a signal converter 163 coupled to the temperature sensor 161. These sensors and converters may be identical to those previously discussed above.

The Lamination Phase

Figure 5:
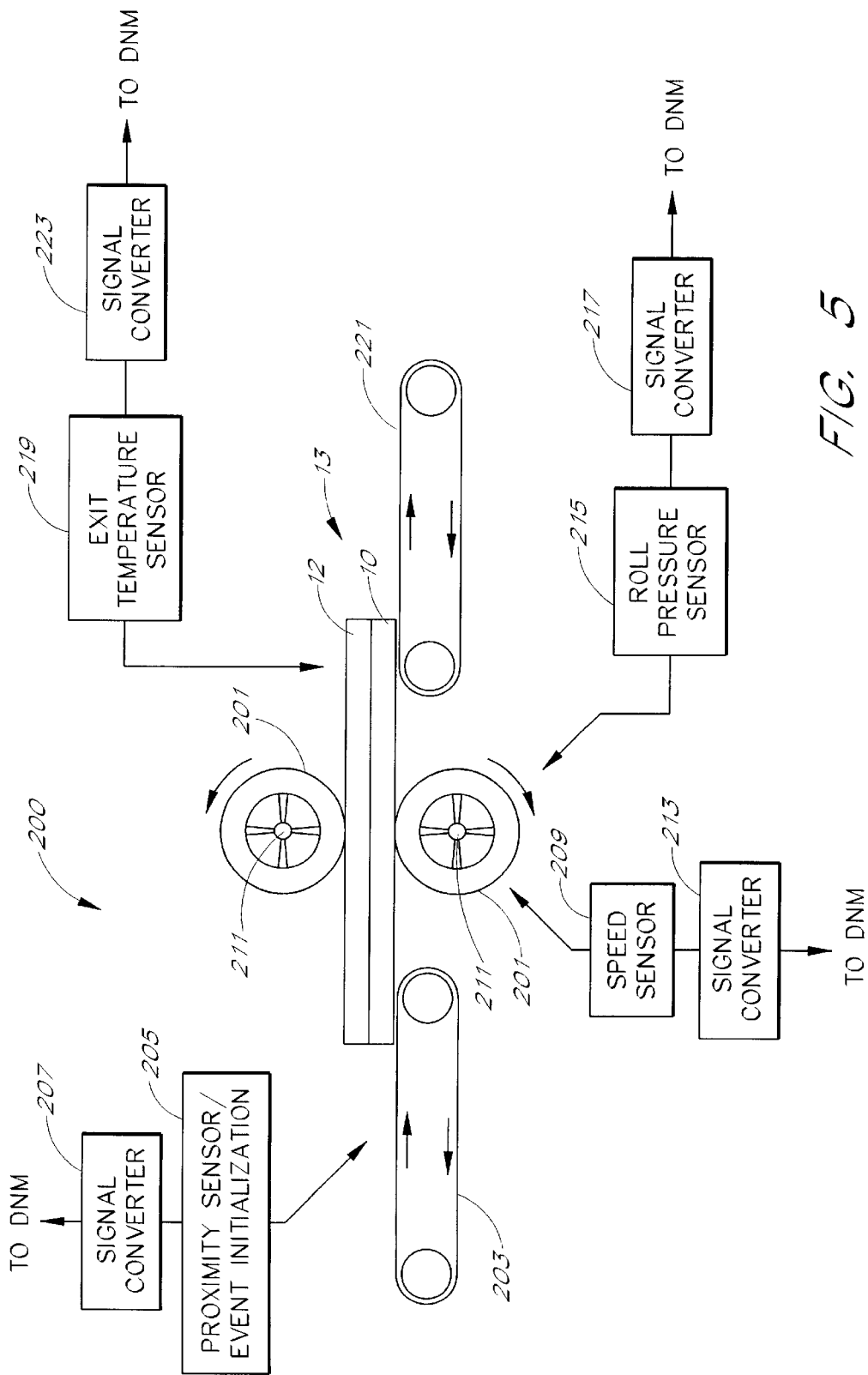
FIG. 5 illustrates a functional diagram of one embodiment of a lamination system having sensors coupled thereto for monitoring process parameters associated with the lamination process in accordance with the invention.

FIG. 5 illustrates a functional diagram of a lamination system having sensors coupled thereto for monitoring process parameters associated with the lamination phase of the PCB manufacturing process. The lamination system 200 includes two nip rollers 201 which laminate a photoresistive film (resist) 12 onto the surface of the copper panel 10 by pressing the resist 12 onto the surface of the copper panel 10 at a specified pressure and temperature, thereby conforming the resist 12 to the topography of the surface of the copper panel 10. The resist 12 is typically a sheet of specified material which is cut from a roll of the resist sheet material so that its size matches the size of the copper panel 10. The resist 12 is then laid on top of the copper panel 10 and thereafter transported to the nip rollers 201 of the laminator 200.

As described above with reference to FIGS. 1 and 2, it is critical to the PCB manufacturing process that the resist 12 is properly conformed to the topography of the copper panel 10 surface. If there is poor conformation between the resist 12 and the copper panel 10, the copper panel 10 will not be adequately protected in the subsequent process step of etching. As a result, nicks in the copper circuitry, open circuits, or short circuits may result. The level of conformation is largely determined by parameters such as the pressure under which the nip rollers press the resist onto the surface of the copper panel, the temperature of the nip rollers 201 during the lamination phase and the temperature of the resist 12 itself. Also, the speed of rotation of the rollers which dictates the amount of time in which the resist and copper panel are subject to the specified pressure and temperature of the rollers, greatly determines the degree of conformation between the resist 12 and the copper panel 10.

As shown in FIG. 5, the lamination system 200 includes a first conveyor belt 203 which transports the copper panel/resist assembly (assembly) 13 to the nip rollers 201. A proximity sensor 205 is located adjacent to the first conveyor belt 203 and senses when the assembly 13 has reached a certain vicinity of the nip rollers 201. In one embodiment, the proximity sensor 205 is an Omron E2E proximity sensor which detects the magnetic inductance of the copper panel 10 in order to ascertain its presence. The operation of such a proximity sensor is discussed above with respect to the proximity sensor 109 of FIG. 4 and, therefore, need not be further described here. Coupled to the proximity sensor 205 is a signal converter 207 which receives a 4–20 ma signal from the proximity sensor 205 and converts this signal into a digital signal having a specified data format. This digital signal is then transmitted to the master module.

The speed of rotation of the nip rollers 201 is monitored by a speed sensor 209 which picks up ticks of a rotating drive wheel, or sprocket 211, which controls the rotation of a respective roller 201. In one embodiment this speed sensor is also an Omron E2E series sensor which detects the teeth, or spokes, of the rotating sprocket 211 as they pass an inductive sensor in the Omron E2E. By monitoring the frequency of the teeth passing by the inductive sensor, the Omron E2E produces electrical pulses which have a frequency corresponding to the frequency of the ticks detected by the sensor. These pulses are then transmitted to a signal converter 213 which convert the pulses into a digital signal having a specified data format. In one embodiment, this specified data format conforms to a standard digital communication protocol known as the DeviceNet™ protocol developed by the Open DeviceNet Vendor Association, Inc. (ODVA). This digital signal, having the specified data format, is then transmitted to a master module which receives and identifies the digital information and thereafter transmits this information to a controller of the SPCIS. The structure and operation of the master module and the controller are described in greater detail below with reference to FIG. 10.

The pressure under which the resist 12 is pressed onto the surface of the copper panel 10 greatly determines the quality of conformation between the resist 12 and the copper panel 10. If the pressure is too low, poor conformation will result and the resist will not be driven into the voids, valleys, indentations, and other surface irregularities present in the topography of the copper panel surface. This results in the formation of microbubbles or interfacial voids between the resist 12 and the copper panel 10. As is well known in the art, these interfacial voids often result in nicks, open circuits and/or short circuits in the copper circuitry which forms a layer of the PCB. Therefore, the elimination or reduction of interfacial voids is critical to the quality of the PCB manufacturing process.

As shown in FIG. 5, a roll pressure sensor 215 is coupled to the nip rollers 201 and measures the pressure produced by the nip rollers 201 to press the resist 12 onto the surface of the copper panel 10 as the panel and resist are squeezed through the nip of the nip rollers 201. In one embodiment, the pressure sensor is an Omega Linear Current Output Pressure Sensor which converts a measured pressure, for example, 0–300 psi, into a proportionally linear output current signal in the range of 4–20 ma. This 4–20 ma signal is then transmitted to a signal converter 217 which converts the 4–20 ma signal into a digital signal having a specified data format. As described above, this specified data format may be in conformance with a standard digital communication protocol known as the DeviceNet protocol as described above. The digital signal is then sent to the master module which is coupled to a programmable logic controller of the SPCIS.

An exit temperature sensor 219 is located adjacent to a position where the assembly 13 exits from the nip rollers 201. The exit temperature measures and monitors the temperature at which the lamination process takes place by measuring the temperature of the assembly 13 as it leaves the nip of the nip rollers 201. In one embodiment, the temperature sensor is a Watlow/Exergen infrared temperature sensor, manufactured by Omega Engineering, Inc., located in Decorah, Iowa, which "sees" the heat emanating from the assembly 13 and generates a proportional 4–20 ma signal. For example, a temperature range of 95° C.–135° C. may be converted into a linear 4–20 ma signal. As described above, this 4–20 ma signal is then transmitted to a signal converter 223 which converts the analog current signal into a digital signal having a specified data format. This specified data format may be in conformance with the DeviceNet Communication protocol. The digital signal is then transmitted to the master module (DNM) which receives and interprets the data and, thereafter transmits the data to a controller for further processing and/or storage.

The Artwork Generation Phase

After the assembly 13 has completed the lamination phase it then enters a photoprinting phase. The photoprinting phase requires a phototool to be placed on top of the resist 12. Therefore, a phototool must first be created during an artwork generation phase, as described above. The process of creating a phototool includes taking a piece of raw film which contains light sensitive emulsions and exposing the film to a light pattern which emulates the traces of a copper circuit, or other desired pattern. When the light hits the emulsions it changes the chemistry of the film and darkens the film in a pattern which matches the copper traces of the desired circuit, or other desired pattern, which may be used to form a layer of the PCB.

The Photoprinting Phase

Figure 6:
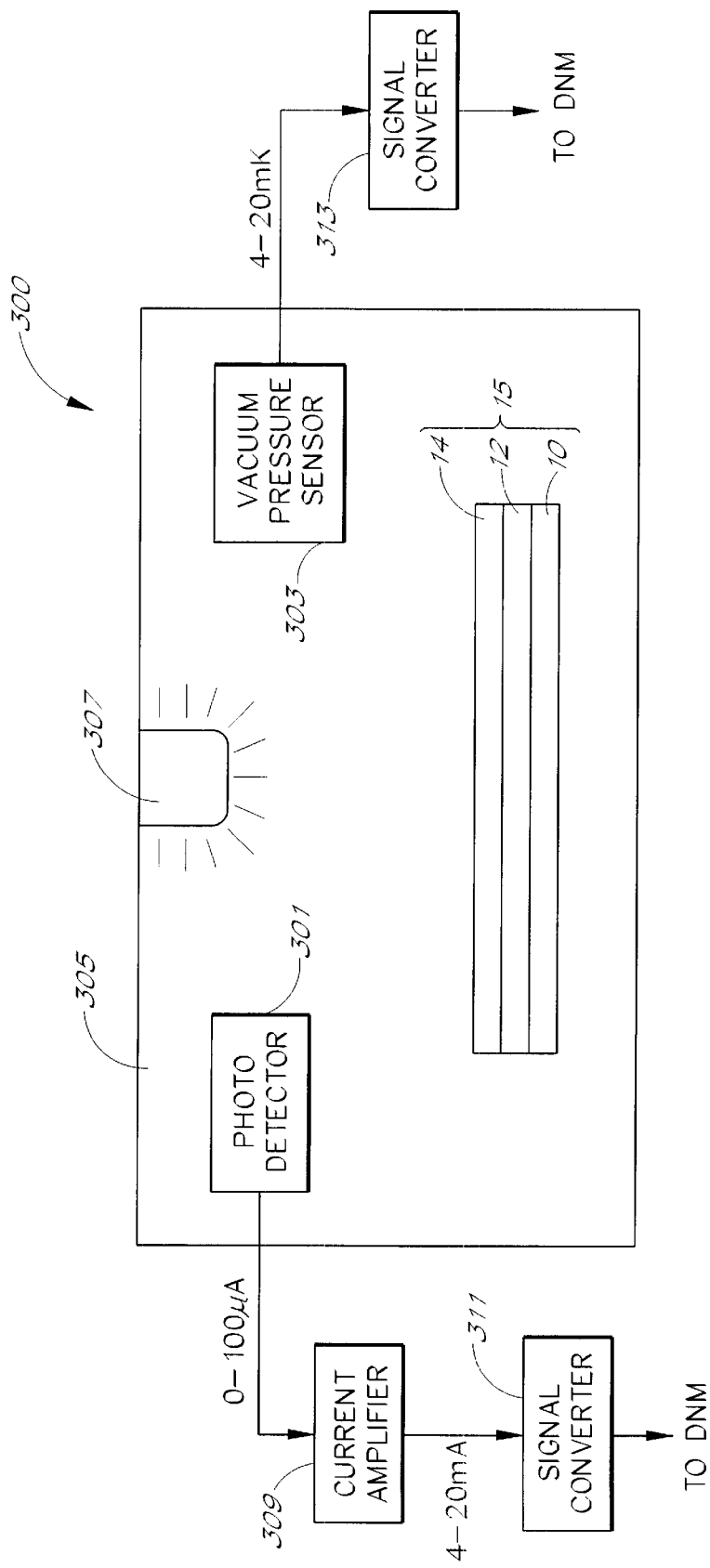
FIG. 6 illustrates a functional diagram of one embodiment of a photoprinting system having sensors coupled thereto for monitoring process parameters associated with the photoprinting phase in accordance with the invention.

Referring to FIG. 6, during the pliotoprinting phase, a phototool 14 is laid on top of the resist 12 which was previously laminated onto the surface of the copper panel 10, as described above. FIG. 6 illustrates a functional diagram of one embodiment of a photoprinting machine 300 having sensors 301 and 303 coupled thereto for monitoring process parameters associated with the photoprinting phase of the PCB manufacturing process. The photoprinting system 300 includes a vacuum chamber 305 in which the phototool/resist/copper panel assembly 15 (assembly 15) is placed. While in the vacuum chamber 305, a vacuum pressure, typically a negative pressure in the range of 0–30 Hg, is applied to the assembly 15 such that the phototool 14 is pressed, or "sucked", onto the top surface of the resist 12. As previously discussed, an adequate vacuum pressure is important to ensure that the phototool 14 is properly pressed onto the top surface of the resist 12. It is appreciated that the closer the phototool 14 is pressed against the resist 12, the better the resolution of the resulting exposure pattern produced by exposing the assembly 15 to a light, typically UV radiation light, emanating from a light source 307.

The UV light radiates through the clear portions of the phototool 14 and exposes the portions of resist 12 directly under these clear portions of the phototool. The clear portions of the phototool may correspond to either the copper traces of a desired circuit or the negative of the copper traces. When the underlying resist 12 is exposed to the UV radiation from the light source 307, a chemical change occurs in the resist 12 which makes the exposed portions of the resist 12 less susceptible to breakdown during a subsequent developing phase which will be described in further detail below. Proper exposure of the resist depends on the amount of energy radiated onto the film and also the type of resist used, and its thickness. Energy is typically measured in joules and largely depends on the light intensity (milliwatts) and the time (seconds) duration in which this light intensity is radiated onto the resist 12.

Two process parameters advantageously monitored during the photoprinting phase are the intensity of the UV radiation and the vacuum pressure within the vacuum chamber 305. As shown in FIG. 6, the photo detector 301 is present within the vacuum chamber 305 for measuring a vacuum pressure therein. In one embodiment, the photodetector 301 is a part of an International Light Output Module (ILOM). The ILOM includes the photodetector 301 plus an amplifier module 309, coupled thereto. The photodetector 301 detects the intensity of UV light being radiated from the light source 307, typically in the range of 0–60 milliwatts, and produces a low current output which is proportional to the measured intensity, typically in the range of 0–100 microamps. The amplifier module 309 then converts the 0–100 microamps signal into a 4–20 ma signal. In one embodiment, the 0–100 microamps signal is converted into a 0–1 volt DC signal within the ILOM. The 0–1 VDC signal is then converted into a 4–20 ma signal by an Entralec signal conditioner, manufactured by Entralec, Inc., located in Irving, Texas. The 4–20 ma signal is then transmitted to a signal converter, such as an analog input module, which converts the 4–20 ma signal into a digital signal having a specified data format. This digital signal is then sent to the master module (DNM) which receives, identifies and thereafter transmits the digital data to a controller of the SPCIS.

A vacuum pressure sensor 303 is also located within the vacuum chamber 305. In one embodiment, the vacuum pressure sensor 303 is an Ashcroft K1 pressure sensor which measures a negative pressure, typically in the range 0–30 Hg, and converts this measured vacuum pressure into a linearly proportional 4–20 ma signal. This 4–20 ma signal is then transmitted to an signal converter 313 which converts the current signal into a digital signal having a specified data format. This digital signal is then sent to the master module which is coupled to a controller of the SPCIS system as described above.

The Developing Phase

After the photoprinting phase has been completed, the assembly 15 (FIG. 6) is ready to enter the developing stage of the PCB manufacturing process. A first step of the developing phase is to pull away the phototool 14 from the underlying resist 12. Typically, there is a mylar sheet on top of the resist 12 which must also be removed prior to spraying a developer solution onto the resist 12. The mylar protects the resist 12 from absorbing oxygen during the above-described processes. As is well known in the art, when a resist 12 absorbs oxygen, many developing problems may occur. One such problem is that the unexposed soft areas of the resist 12 become harder, thereby inhibiting a developer solution from breaking down and removing the desired portions of the resist 12 from the copper panel 10.

Figure 7:
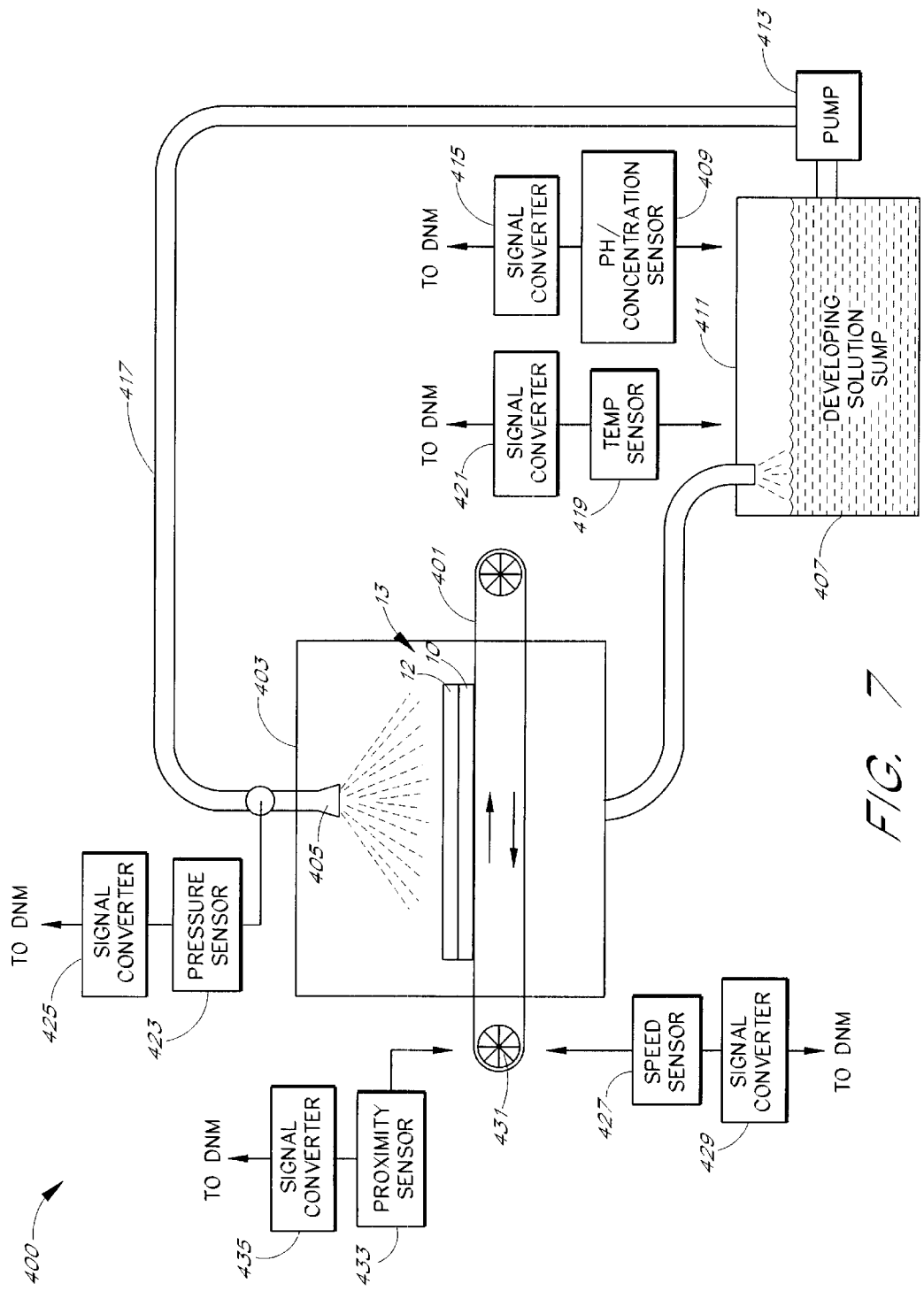
FIG. 7 illustrates a functional diagram of one embodiment of a developing system having sensors coupled thereto for monitoring process parameters associated with the developing phase in accordance with the invention.

FIG. 7 illustrates a functional diagram of a developing system 400 configured in accordance with the present invention. After the phototool 14 (FIG. 6) and mylar sheet (not shown) have been pulled away from the underlying resist 12, as described above, the remaining assembly 13 is transported on a conveyor belt 401 through a developing chamber 403 having a pressurized nozzle 405 which sprays a developer solution 407 onto the resist 12 at a predetermined pressure. The resist/copper panel assembly 13 is transported through the developing chamber 403 at a specified speed so as to provide a specific "breakpoint" in which unexposed portions of the resist 12 are cleaned away from the panel 10. The breakpoint is typically defined in terms of the percentage of time required to remove all of the unexposed portions of the resist 12 from the surface of the copper panel 10 with respect to the total amount of time that the assembly spends in the developing chamber 403. Therefore, a breakpoint of 75%, for example, means that when the assembly has completed 75% of the time that it spends in the developing chamber 403, most or all of the unexposed portions of the resist 12 have been removed from the copper panel 10. This breakpoint is defined in order ensure that by the end of the developing stage the desired amount of resist 12 has been removed from the panel 10.

The rate and quality of the removal of unexposed resist is determined by many factors. Typically, the developer solution 407 is sodium carbonate monohydrate and/or potassium carbonate mixed with water ($H_2O$). It is desirable to maintain the pH level of this developer solution 407 between 10.2–11.5. The monitoring of the pH level of the developer solution 407 is important because if the pH is too low, the developer solution 407 will not be active enough to break down the unexposed portions of the resist 12 within a required time frame. If the pH is too high, the developer solution 407 may clean too rapidly and also break down the hardened, exposed resist portions which should not be removed.

As shown in FIG. 7, the pH of the developing solution 407 is monitored by a pH/concentration sensor 409 which is coupled to a sump 411 which contains the developer solution 407. The developer solution 407 is pumped from the sump 411 via a pump 413 to the pressurized nozzle 405. In an alternative embodiment, pH sensor 409 may be coupled to the fluid line, or tube 417, which connects the pressurized nozzle 405 to the pump 413. In one embodiment, the pH sensor 409 is an Omega pH monitor, manufactured by Omega Engineering, Inc., located in Stamford, Conn., which measures the pH of the developing solution 407 contained in the sump 411 and converts this measured value into a 4–20 ma signal which is linearly proportional to the measured pH level. As explained above, this 4–20 ma signal is then transmitted to a signal converter 415 which converts the analog signal into a digital signal having a specified data format. The digital signal is then transmitted to a master module which is coupled to an SPCIS database for receiving, storing and processing the digital data.

The concentration of the developer solution is also important in determining the effectiveness of the solution in removing and breaking down the resist at its desired locations. It is known in the art that the concentration of a solution can be measured by a device called a titration concentration analyzer. In one embodiment of the invention, the pH/concentration sensor 409 is a Mettler Toledo DR170 titration concentration analyzer manufactured by Mettler Toledo, Inc., located in Hightown, N.J. The analyzer is coupled to the sump 411 in order to measure the concentration level of the developer solution 407. The concentration level of a solution is typically measured in parts per million (ppm) of one chemical substance in proportion to another. Through well-known principals of concentration analysis, the titration concentration analyzer 409 measures the concentration of a particular developing solution and transform this measured value into a 4–20 ma signal which may then be utilized in the SPCIS system as described above.

The temperature of the developer solution also affects the ability of the developer solution 407 to break down unexposed resist 12. In one embodiment, the temperature is maintained in a range between 80° F.–90° F., the optimum temperature being 85° F.±3° F. Similar to the pH level, if the temperature of the developer solution is too low, the developer solution will not be active enough to break down the desired portions of the resist 12. If the temperature of the developer solution is too high, the solution will clean rapidly but may also break down hardened, unexposed portions of the resist 12.

A temperature sensor 419 is also coupled to the sump 411 in order to measure the temperature of the developing solution 407 contained in the sump 411. The temperature sensor 419 may be identical to the temperature sensors 131, 148 and 161 of FIG. 4. In one embodiment, the temperature sensor 419 outputs a 4–20 ma signal which is proportional to a measured temperature value. The 4–20 ma signal is then sent to a signal converter 421 which converts the analog signal into a digital signal having a specified data format. This digital signal is then transmitted to the master module of the SPCIS.

The pressure under which the developer solution 407 is sprayed onto the resist 12 is also important to the effectiveness of the developer solution 407 in removing the desired portions of the resist 12. If the pressure is too low, the spray will be ineffective in breaking down and removing the softened portions of the resist 12. If the pressure is too high, the developer solution may damage and/or remove undesired portions of the resist 12, leading to subsequent problems during the etching phase as will be described in further detail below.

As shown in FIG. 7, a pressure sensor 423 is coupled to the nozzle 405 and measures the in-line liquid pressure of the developing solution 407 within the nozzle 405. This pressure sensor 423 may be identical to those described above and in one embodiment, generates a 4–20 ma signal which is then transmitted to a signal converter 425. The signal converter 425 then converts the 4–20 ma signal into a digital signal having a specified data format. This digital signal is then transmitted to the master module of the SPCIS.

The speed in which the assembly 13 is transported under the pressurized spray determines the length of time that the assembly 13 is exposed to the developer solution 407 which is sprayed onto the assembly 13 at a specified temperature and pressure, as described above. The speed of the conveyor which transports the assembly determines the breakpoint in which the unexposed resist is cleaned off the panel. A speed sensor 427 and a signal converter 429 is coupled to a drive wheel 431 which drives the motion of the conveyor belt 401. The operation of this speed sensor 427 and the signal converter 429 may be identical to the speed sensors and signal converters described above and need not be further described here.

Also shown in FIG. 7, is a proximity sensor 433 and a signal converter 435 coupled to the proximity sensor 433. The operation of the proximity sensor 433 and the signal converter 435 may be identical to that of the proximity sensors and the signal converters described above with respect to FIGS. 4 and 5.

The Post-developing Rinse and Dry Phase

After the developing stage, the assembly will enter a rinse stage in which excess developing solution and/or excess unexposed resist is washed away from the remaining assembly. In typical developing processes, 90–95% of the desired resist is removed from the assembly. The remaining 5–10% of the unexposed resist is referred to as "scum" in the PCB manufacturing industry. Therefore, the rinse stage is important in removing the scum which remains after the developing stage and any remaining developing solution which is on the assembly. Important process parameters that may be monitored during the rinse stage are the temperature of the water used to rinse the assembly and the pressure under which the water is sprayed onto the assembly. These process parameters may be measured similarly as described above. Therefore, a further description of this measuring process is not given here.

Another important process parameter which may be monitored during the rinse stage is the water hardness, typically measured in parts per million (ppm) of calcium and/or magnesium with respect to the number of particles of water. Water hardness may be measured in similar fashion to measuring the concentration of the developing solution, as described above. The typical hardness for water is in the range of 125–350 ppm.

After the post-developing rinsing stage, the assembly 13 typically enters into a drying stage in which the water and any other fluid residues are dried from the assembly. This is typically accomplished by means of a pressurized air spray which is applied to the assembly at a specified pressure and temperature. In order to ensure proper drying of the assembly, the pressure and temperature at which the air is maintained should be monitored. Therefore, a pressure sensor and a temperature sensor may be coupled to the drying chamber in order to monitor these process parameters. Since the pressure and temperature variables may be monitored in a similar fashion to that described above, a further description of this monitoring process is not presented here.

The Etching Phase

Figure 8:
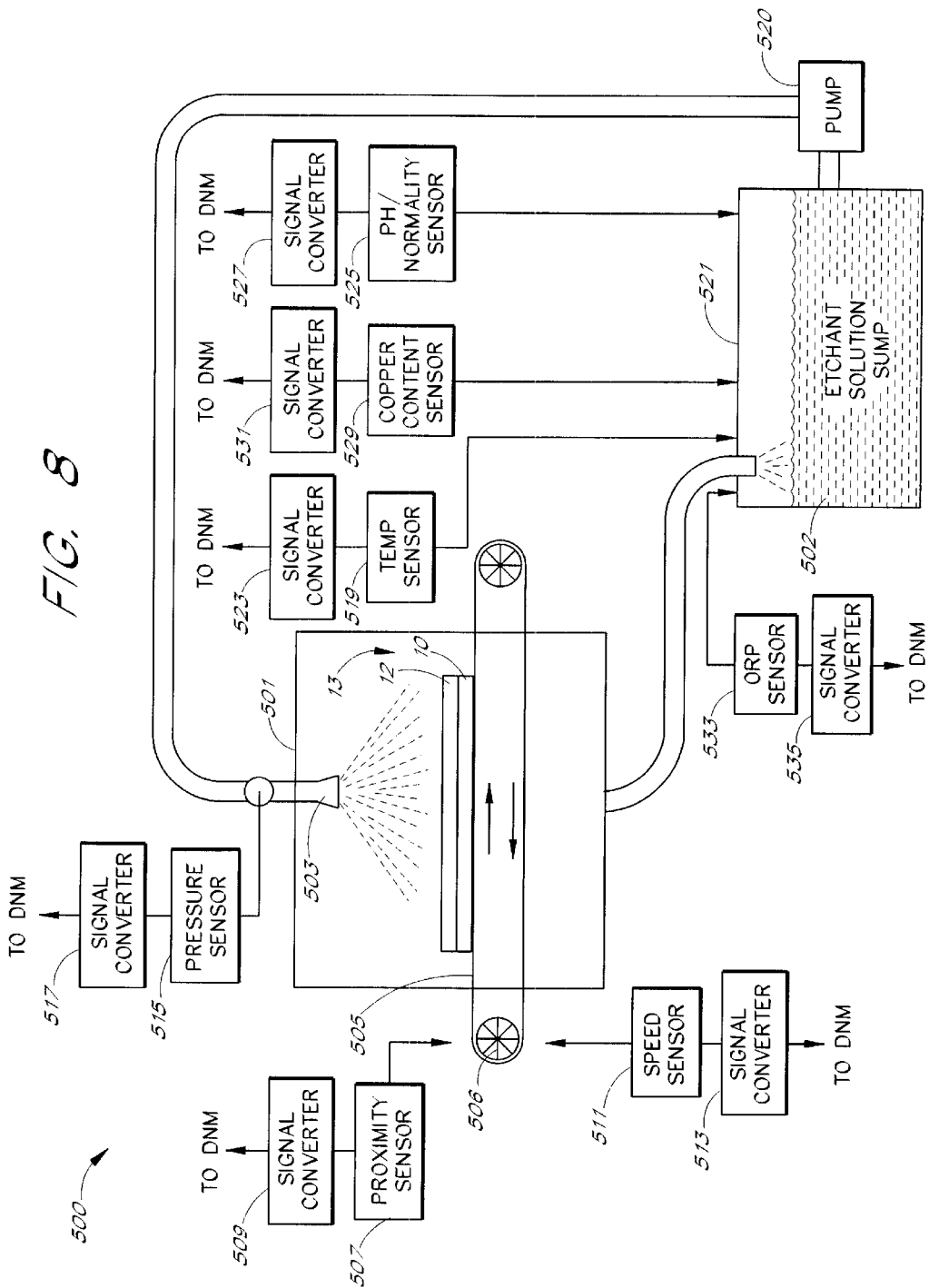
FIG. 8 illustrates a functional diagram of one embodiment of an etching system having sensors coupled thereto for monitoring process parameters associated with the etching stage of the PCB manufacturing process in accordance with the invention.

The next phase of the PCB manufacturing process is the etching phase. FIG. 8 shows an etching system 500 having multiple sensors coupled thereto for measuring and monitoring process parameters associated with the etching process. After the assembly 13 has completed the developing, rinsing and drying stages described above, the assembly 13 now consists of the copper panel 10 with a patterned resist layer 12 laminated onto the top surface of the copper panel 10. The patterned resist 12 is the remaining resist which was exposed to UV radiation, and therefore not removed from the copper panel during the developing stage. Typically, this pattern resist 12 corresponds to the copper traces of a desired circuit to be formed.

The etching process is very similar to the developing process, the assembly 13 enters an etching chamber 501 in which an etchant solution 502 is sprayed onto the assembly 13 at a specified pressure through a nozzle 503 contained within the etching chamber 501. The etchant solution 502 is also typically maintained at a specified temperature. Additionally, the assembly 13 is transported through the etching chamber at a specified speed. As shown in FIG. 8, the etching system 500 includes a conveyer system 505 which transports the assembly 13 through the etching chamber 501. A proximity sensor 507 is positioned adjacent to the conveyor system 505 at a location before the assembly 13 enters the etching chamber 501. A signal converter 509 is coupled to the proximity sensor 507. The proximity sensor 507 and signal converter 509 may be identical to those described above. Therefore a further discussion of this operation is not given here.

Also shown in FIG. 8 is a speed sensor 511 coupled to a drive wheel 506 which drives the conveyor belt 505, a signal converter 513 coupled to the speed sensor 511, a pressure sensor 515 coupled to the nozzle 503, a signal converter 517 coupled to the pressure sensor 515, a temperature sensor 519 coupled to a sump 521 which contains the etchant solution 502, and a signal converter 523 coupled to the temperature sensor 519. These sensors and signal converters may be identical to those described above. Therefore their operation and functionality need not be further described here.

Other process parameters which affect the etching process relate to the chemical composition and/or characteristics of the particular etchant solution used. Two common types of etchant solutions are acid-based and alkaline-based etchant solutions.

For acid based etchant solutions, such as acid cupric chloride, important chemical parameters are: normality of chemistry, which is a measure of the concentration of acid, such as hydrochloric acid, in the etchant solution; and the copper content of the solution. As is well known in the art, the concentration of hydrochloric acid in the etchant solution greatly affects the chemical properties of the etchant solution. For example, if the hydrochloric acid concentration drops below a normality of 0.5 N, cuprous chloride may precipitate and produce toxic chlorine gases. The acid concentration also has a significant affect on the etch rate and undercut. Higher acid normality produces a higher etch rate but also produces greater undercut. Normalities higher than 3 N could be harmful to some resists and also the pumps of the etching system. Therefore, the normality of chemistry should be maintained between a range of 0.5–3.0 N. The hydrochloric acid normality is generally maintained at 1.0–3.0 N. A control around 1.0 N is best suited for high resolution, while 2.0–3.0 N favors high productivity. This normality may be monitored by wellknown methods of acid titration.

As shown in FIG. 8, 8 a pH/normality sensor 525 is coupled to the sump 521. In one embodiment the pH/normality sensor 525 is a platinum combination redox electrode, part no. 967800, manufactured by Orion, Inc., located at Beverly, Mass., which measures the normality of concentration of the etchant solution 502 and generates a 4–20 ma output signal which is proportional to the measured normality value. The 4–20 ma output signal is then transmitted to the signal converter, or analog input module 527, which converts the analog signal into a digital signal having a specified data format. The digital signal is then transmitted to the master module of the SPCIS.

Another important process parameter which affects the quality and rate of etching is the copper content of the etchant solution. The copper content range of the etchant solution is established and maintained to give the best quality etch, including etch factor and smoothness of side walls. The etch rate will slow at copper concentrations appreciably below the operating range. The copper content is normally maintained between 21–25 ounces per gallon and can be measured by titration. Well known indicators of the copper concentration in the etchant solution are baumè or specific gravity. Baumè is a measure of specific gravity in degrees, and specific gravity is a measure of the density of one substance (e.g., copper) to the density of another substance (e.g., the liquid etchant solution or water). As the copper content rises, so does the baumè or specific gravity of the solution. Therefore, either can be used as an approximation in copper control. In one embodiment, the range for baumè is 28–32° and specific gravity is 1.24–1.28. When the copper rises above the desired limit, an acid replenisher is added to lower the copper concentration (and baumè or specific gravity).

A copper content sensor 529 is coupled to the sump 521 for measuring the copper content of the etchant solution 502 contained within the sump 521. In one embodiment, the copper content sensor 529 is an Orion platinum combination redox electrode, part no. 967800, which measures the baumè of the etchant solution and generates a 4–20 ma output signal. The 4–20 ma signal is then transmitted to an analog input module, or signal converter 531, which converts the analog signal into a digital signal having a specified data format. The digital signal is then transmitted to the master module of the SPCIS.

Another important factor that affects the etch rate of acid cupric chloride is the relative concentrations of cupric ions (oxidizing agent and the bulk of the copper ions) to cuprous ions (initial product after oxidation of the copper metal). By controlling the cuprous to cupric ions ratio, a constant etch rate is obtainable. A measure of cupric ions to cuprous ions is typically given by what is known in the industry as the oxidation-reduction potential (ORP). High concentrations of cupric ions and low concentrations of cuprous ions give high ORP readings and generally produce higher etch rates.

As shown in FIG. 8, an ORP sensor 533 is coupled to the sump 521 for measuring the oxidation reduction potential of the etchant solution 502. In one embodiment, the ORP sensor 533 is an Orion platinum combination redox electrode, part no. 967800, which takes a measured ORP reading and converts this measured reading into a 4–20 ma signal which is proportional to the measured reading. The ORP sensor 533 then transmits this signal to an analog input module, or signal converter 535. The signal converter 535 converts the 4–20 ma signal into a digital signal having a specified data format and then transmits the digital signal to the master module of the SPCIS.

The ORP measurement is used to control the etch rate and additions of replenishment chemistry. An electronic instrument called an ORP controller is set to maintain the ORP levels which give the most stable etch rate along with the most stable chemistry. A replenishment or regeneration system for maintaining the chemical composition of the etchant solution relatively constant is necessary to provide a uniform and stable etching process. The regeneration system typically includes chlorine gas, hydrogen peroxide, or sodium chlorate replenishment supplies which may be added to the etchant solution 502 in order to maintain its chemical balance. All of these chemicals rapidly oxidize cuprous ions to cupric.

As copper is etched, there is an increased concentration of cuprous ions that decreases the millivolt reading on the ORP control. When the ORP reading drops below the lower set point, the ORP control unit will call for replenishment. One of the previously mentioned chlorine, peroxide or chlorate regeneration systems is introduced at this point. Chlorine regeneration will involve the addition of chlorine gas only. Both peroxide and chlorate regenerations involve the addition of these chemicals and hydrochloric acid. The addition of the acid is made sequentially in proportional amounts with the oxidizer. The ORP reading will rise as the replenisher is added and the cuprous ions are oxidized. When the ORP has risen to the upper set point, the regeneration system will shut off.

We now turn to a second popular method of etching—that of alkaline-based etching in which the etchant solution is ammonia-based. The process is similar to that described above for acid cupric chloride etching. The copper panel assembly is transported by a conveyor through an etching chamber in which an etchant solution is sprayed onto the assembly at a specified pressure and temperature. However, in alkaline etching, an important chemical process parameter is not the acid concentration but rather the pH level of the etchant solution. The higher the pH level of the etchant solution, the faster the etch rate produced.

Referring to FIG. 8, in one embodiment, the pH/normality sensor 525 is an Orion Platinum Combination Redox Electrode, model no. 967800, which measures the pH of the etchant solution 502 and outputs a 4–20 ma signal which is then transmitted to the analog input module, or signal converter 527. The signal converter 527 then converts the 4–20 ma signal into a digital signal having a specified data format. The digital signal may then be transmitted to the master module of the SPCIS. In one embodiment, the pH range of the alkaline etchant solution is maintained at a range of 7.5–8.7. Other process parameters associated with the alkaline etching method include the temperature of the etchant solution, the pressure at which the etchant solution is sprayed onto the copper panel assembly, the copper content, or baumè, of the etchant solution and the conveyor speed at which the assembly is transported through the etchant chamber. These process parameters may be monitored in a similar fashion as described above with respect to acid-based etchant solutions. It is noted that for acid-based etching the pH/normality sensor 525 is a normality sensor which measures the normality of concentration of the acid-based etchant solution. However, for alkaline-based etching, the pH/normality sensor 525 is a pH sensor which measures the pH of the alkaline-based etchant solution.

After the etching phase of the process is completed, the assembly undergoes a second rinse under a water flow set at a specified pressure and temperature. This pressure and temperature may be monitored as described above with respect to the previous processes.

The Stripping Phase

Figure 9:
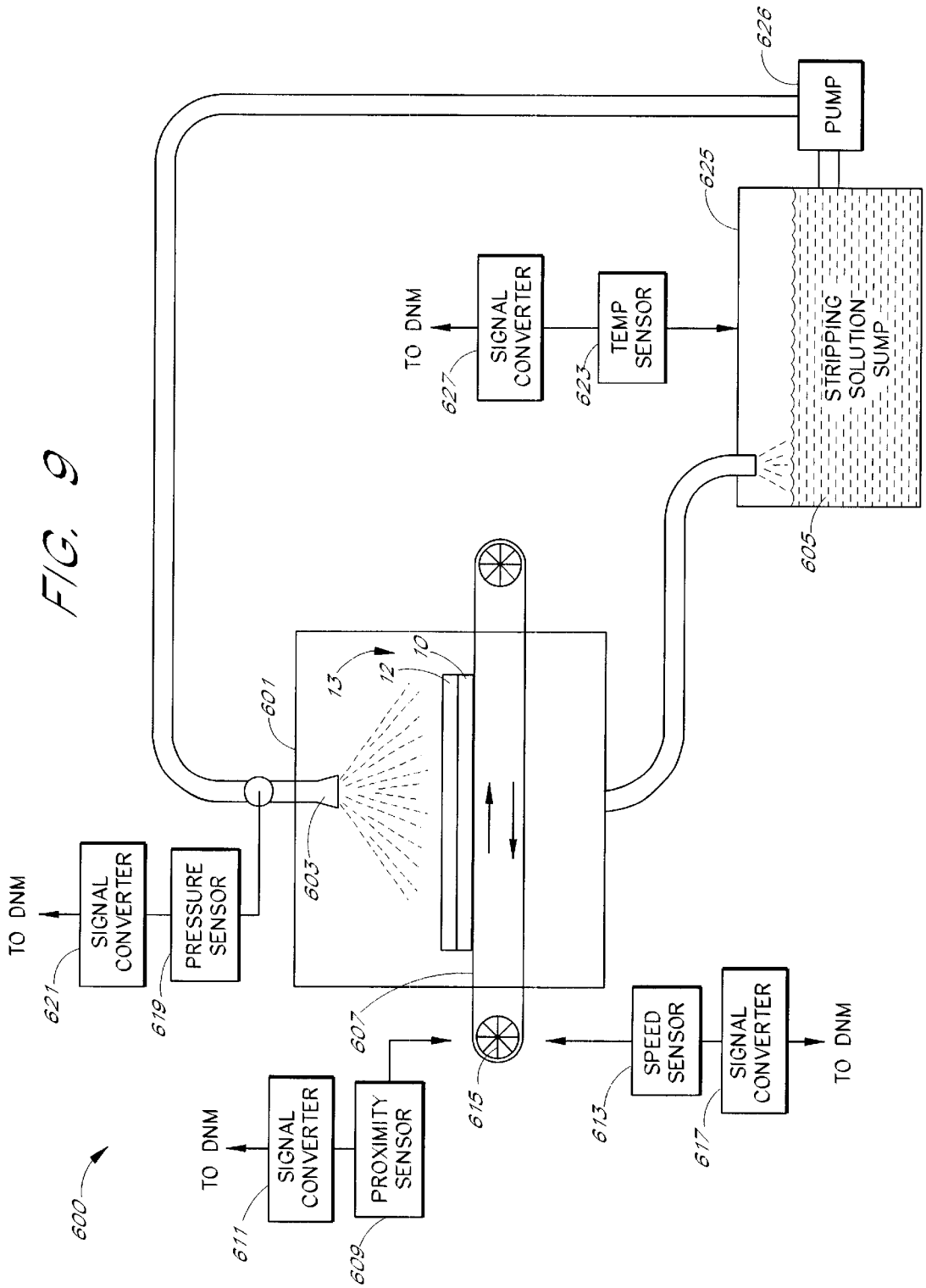
FIG. 9 illustrates a functional diagram of one embodiment of a stripping system having sensors coupled thereto for monitoring process parameters associated with the stripping stage of the PCB manufacturing process in accordance with the invention.

After the assembly has been properly rinsed after the etching stage, the assembly 13 then enters into the stripping phase wherein the remaining portions of the resist 12 are removed from the copper panel 10. Referring to FIG. 9, a stripping system 600 in accordance with the invention is illustrated. The stripping system 600 includes a stripping chamber 601 having a pressurized nozzle 603 therein for spraying a stripping solution 605 onto the assembly 13. The stripping system 600 also includes a conveyer system 607 for transporting the assembly 13 through the stripping chamber 601 at a specified rate. While inside the stripping chamber 601, the assembly is sprayed by the stripping solution 605 which is maintained at a specified temperature and pressure.

The stripping solution 605 operates under the principals of caustic chemistry and typically, the solution 605 comprises sodium hydroxide, potassium hydroxide, or a mixture of the two. However, other stripping solutions which are well-known in the art may be used during this process. As the assembly 13 moves through the stripping chamber 601, the stripping solution 605 starts to break down the resist 12. The solution 605 attacks the adhesion properties of the polymer resist 12, thereby breaking the chemical bonds of the polymer, as a result of which the resist starts to swell and soften. The pressure from the pressurized spray nozzle 603 further breaks down the resist 12 and removes the resist 12 from the surface of the remaining copper panel 10. The temperature of the stripping solution 605 also greatly effects the chemical action of the stripping solution in breaking down the resist 12.

In one embodiment, the speed of the conveyor is set and maintained such that the breakpoint of the stripping process is set at approximately 20–50%. As described above, the breakpoint refers to the percentage of time in the stripping chamber required to strip a desired amount of resist from the remaining copper panel.

As described above, important process parameters that are advantageously monitored during the stripping stage are the speed of the conveyor, the temperature of the stripping solution 605, and the pressure at which the stripping solution 605 is sprayed onto the assembly 13. The speed, temperature and pressure process parameters are measured and monitored in a similar fashion to that described above with respect to the other processes.

As shown in FIG. 9, a proximity sensor 609 is located at a position adjacent to the conveyor 607 in order to sense when an assembly is ready to enter the stripping chamber 601. A signal converter 611 is coupled to the proximity sensor 609. A speed sensor 613 is coupled to a drive wheel 615 of the conveyor belt 607 and a signal converter 617 is coupled to the speed sensor 613. A pressure sensor 619 is coupled to the pressurized nozzle 603 and a signal converter 621 is coupled to the pressure sensor 619. Finally, a temperature sensor 623 is coupled to a sump 625 which contains the stripping solution 605 therein and a signal converter 627 is coupled to the temperature sensor 623. A pump 626 is coupled to the sump 625 for pumping the stripping solution 605 to the pressurized nozzle 603. The type and operation of the various sensors and the signal converters listed above may be identical to the same type of sensors and signal converters described with respect to the previous processes. Therefore, a further description of each of these sensors and signal converters, and their methods of operation, are not given here.

Although specific process parameters have been described and discussed above, it is understood that the present invention provides for monitoring other measurable process parameters associated with the PCB manufacturing process. Additionally, although each phase of the PCB manufacturing process has been discussed and illustrated separately, it is understood that two or more of these phases may be integrated so as to provide a PCB manufacturing process in which multiple process parameters from multiples phases of the manufacturing process may be monitored in a coordinated fashion in accordance with the invention. A feature of this invention is that the SPCIS system may simultaneously and/or sequentially monitor process parameters associated with a lamination phase and a photoprinting phase of the PCB manufacturing process. Or, the SPCIS system may simultaneously and/or sequentially monitor process parameters associated with all of the phases described above.

SPCIS

Figure 10:
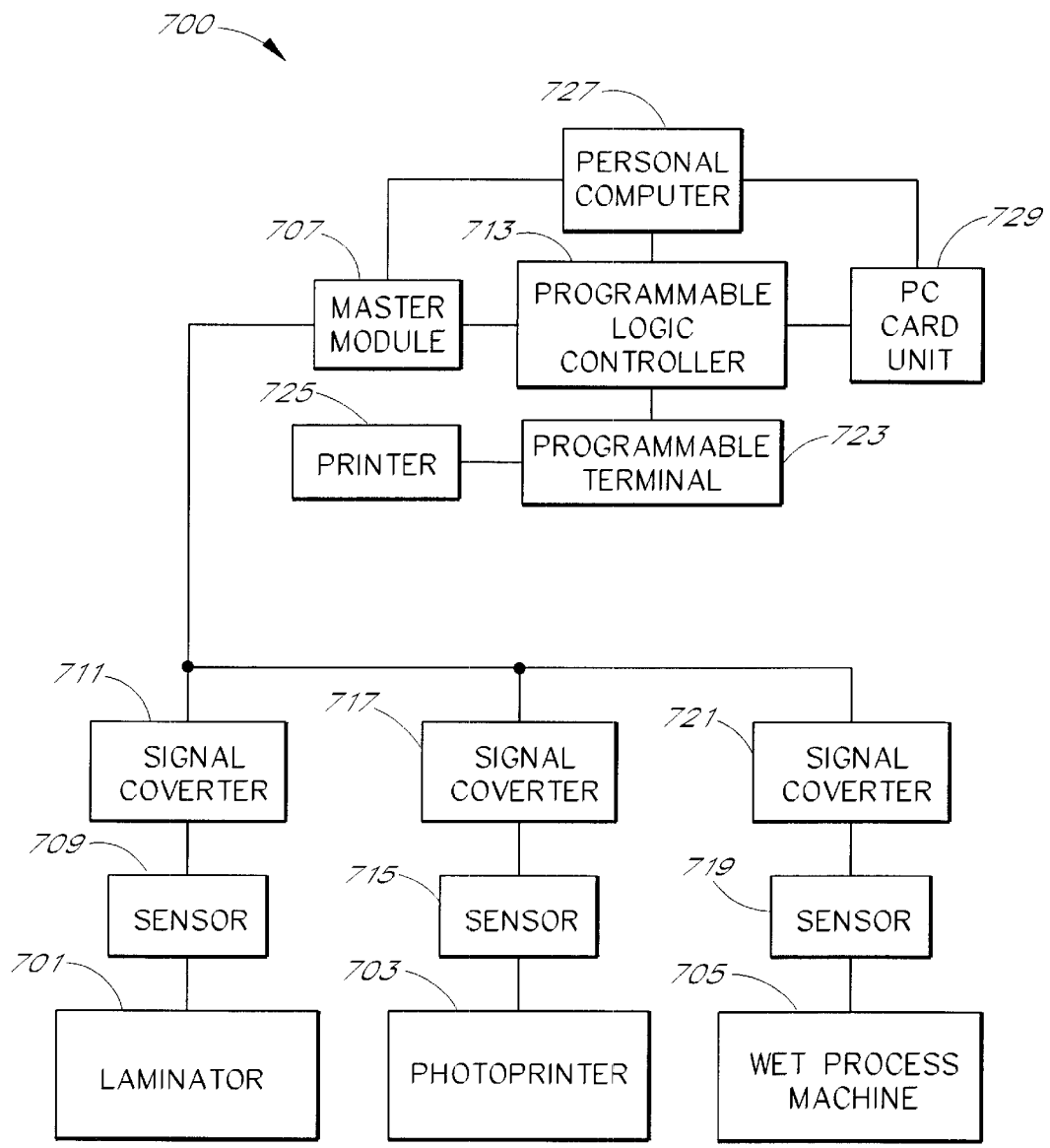
FIG. 10 is a block diagram of one embodiment of a Statistical Process Control Integration System (SPCIS) for monitoring process parameters associated with PCB manufacturing, in accordance with the invention.

FIG. 10 illustrates a block diagram of one embodiment of the statistical process control integration system (SPCIS) 700. For illustrative purposes, a laminator 701, a photo printer 703 and a wet process machine 705 is shown coupled to a master module 707. The wet process machine may be any one of the developing, etching or stripping machines described above. Coupled to the laminator 701 is at least one sensor 709 for measuring a process parameter associated with the lamination process. The sensor 709 may comprise any one or all of the sensors described above in relation to monitoring lamination process parameters. Coupled to the sensor 709 is a signal converter 711 for receiving the output of the sensor, typically either a 4–20 ma signal or a pulse signal, and converting this signal into a digital signal having a specified data format. This digital signal is then transmitted by the signal converter 711 to the master module 707 which receives and interprets the digital signal in accordance with a specified communication protocol. In one embodiment, the specified communication protocol communicates 16-bit datawords from the signal converter 711 to the master module 707. Within each 16-bit dataword, the value of a measured process parameter is represented by a specified number of bits. Additionally, another set of bits are allocated for representing a unique address, or node identifier, which identifies each sensor in the SPCIS system. In this way the master module 707 can distinguish and identify a plurality of signals which it receives from a plurality of sensors. In one embodiment, the master module is an Omron OVDA Master Module, model no. DRM.21, manufactured by Omron, Inc., located in Shaumberg, Ill.

After the master module 707 receives a digital signal from the signal converter 711, a processor within the master module 707 identifies which sensor transmitted the signal (e.g., the temperature sensor 219 of FIG. 5) and assigns the measured value contained in the 16-bit dataword to the process parameter associated with that sensor (e.g., the exit temperature=100° F.). After the master module has received and identified the value of a specific process parameter, e.g,. Exit Temperature=100 degrees F., the master module then sends this data to a programmable logic controller (PLC) 713 which receives, stores and processes the data. In one embodiment, this 16-bit communication protocol is the DeviceNet™ communication protocol developed by the Open DeviceNet Vendor Association, Inc. (ODVA) and which is well-known in the industry. In one embodiment, after the master module 707 has identified the particular parameter (or sensor) corresponding to the digital signal, the master module assigns a particular memory address to the measured process parameter and transmits the measured value of the process parameter and its memory address to the programmable logic controller (PLC) 713. The PLC 713 then stores the measured parameter value in an appropriate memory location in accordance with its memory address. The various process parameters stored in each memory location within the PLC 713 may then be accessed by a personal computer (PC) 727, coupled to the PLC 713. The PC 727 executes a software program which arranges the data in a desired format for storage and/or display.

Similarly, at least one second sensor 715 is coupled to the photoprinter 703 for monitoring process parameters associated with the photoprinting phase. The second sensor 715 may comprise any of the sensors described above in relation to the photoprinting phase. Coupled to the second sensor 715 is a second signal converter 717 for receiving an output signal from the second sensor 715, typically a 4–20 ma signal or a pulse signal, and converting this signal into a digital signal having a specified data format. This digital signal is then sent to the master module 707 which receives and interprets the digital signal in accordance with a specified communication protocol, as described above.

At least one third sensor 719 is coupled to the wet process machine 705 for measuring and monitoring process parameters associated with the particular wet process, e.g., developing, etching or stripping. A third signal converter 721 is coupled to the third sensor 719 for receiving an output signal from a third sensor 719, typically a 4–20 ma signal or a pulse signal, and converting this output signal into a digital signal having a specified data format. This digital signal is then transmitted to the master module 707 which receives and interprets the digital signal in accordance with the specified communication protocol.

After the master module 707 has received and identified digital signals from various signal converters, the data received by the master module 707 is then transmitted to the programmable logic controller 713 which has a database therein for storing the data.

The programmable logic controller 713 is utilized to receive, process and store the data provided by sensing devices 709, 715 and 719 coupled to the various types of processing equipment. The programmable logic controller 713 contains logic function codes for sequentially monitoring input data received from the master module 707 and command structures and protocols for gathering data from the various sensors 709, 715 and 719. The programming codes, structures and protocols contained within the programmable logic controller 713 comprise the intelligence of the SPCIS data acquisition system. In one embodiment, the controller 713 receives trigger signals from the various proximity sensors described above and thereafter, initiates the taking of data from respective process machines by transmitting TAKE DATA commands to the various sensors coupled to the process machines. Programmable logic controllers are well-known in the art and are commonly utilized to control and monitor process machinery.

A programmable terminal 723 is also coupled to the programmable logic controller 713. The programmable terminal 723 serves as an interface between a system operator and the programmable logic controller 713. The programmable terminal visually depicts the equipment monitored and the status of all inputs from each piece of equipment on the system. The programmable terminal 723 allows a system user the ability to request the controller 713 to monitor additional or different process parameters and to download gathered data stored within the programmable logic controller 713. The programmable terminal 723 includes a monitor screen which displays visual representations of select process machinery and/or data related to one or more process machinery. Additionally, the programmable terminal 723 executes a software program correlating data received from the controller 713 and presenting the data in any one of numerous formats.

A printer 725 coupled to the programmable terminal 723 receives commands and data from the programmable terminal 723 in order to print data in a specified format. For example, a system operator may desire to print all of the data associated with measured parameter values related to the pressure at which a developing solution is sprayed onto copper panel assemblies during the developing stage. The printer 725 may print this historical data in any one of a number of well known statistical formats such as a histogram, pareto, scatter, sigma, or x-bar+r format. Or alternatively, the printer may print the data for all process parameters measured for a given process, such as the etching process, in a format desired or specified by a standardization organization such as the International Standardization Organization (ISO).

The personal computer (PC) 727 is used in conjunction with vendor software for providing access to and programming capability for each of the various subsystems 25 of the SPCIS such as the programmable logic controller 713, the programmable terminal 723, the master module 707 and the printer 725. Coupled between the personal computer 727 and the programmable logic controller 713 is a PC card unit 729 which serves as an interface between the programmable logic controller 713 and the computer 727.

The term "vendor software" refers to the software produced by the manufacturer, or vendor, of each of the subsystems/hardware. Through the use of this vendor software, the PC 727 can develop all of the ladder logic code arrangements and protocols used to communicate information between the personal computer 727, the programmable logic controller 713, the programmable terminal 723, the PC card unit 729, the master module 707, the signal converters 711, 717 and 721, and as will be explained in greater detail below, an ethernet/internet network.

Figure 11:
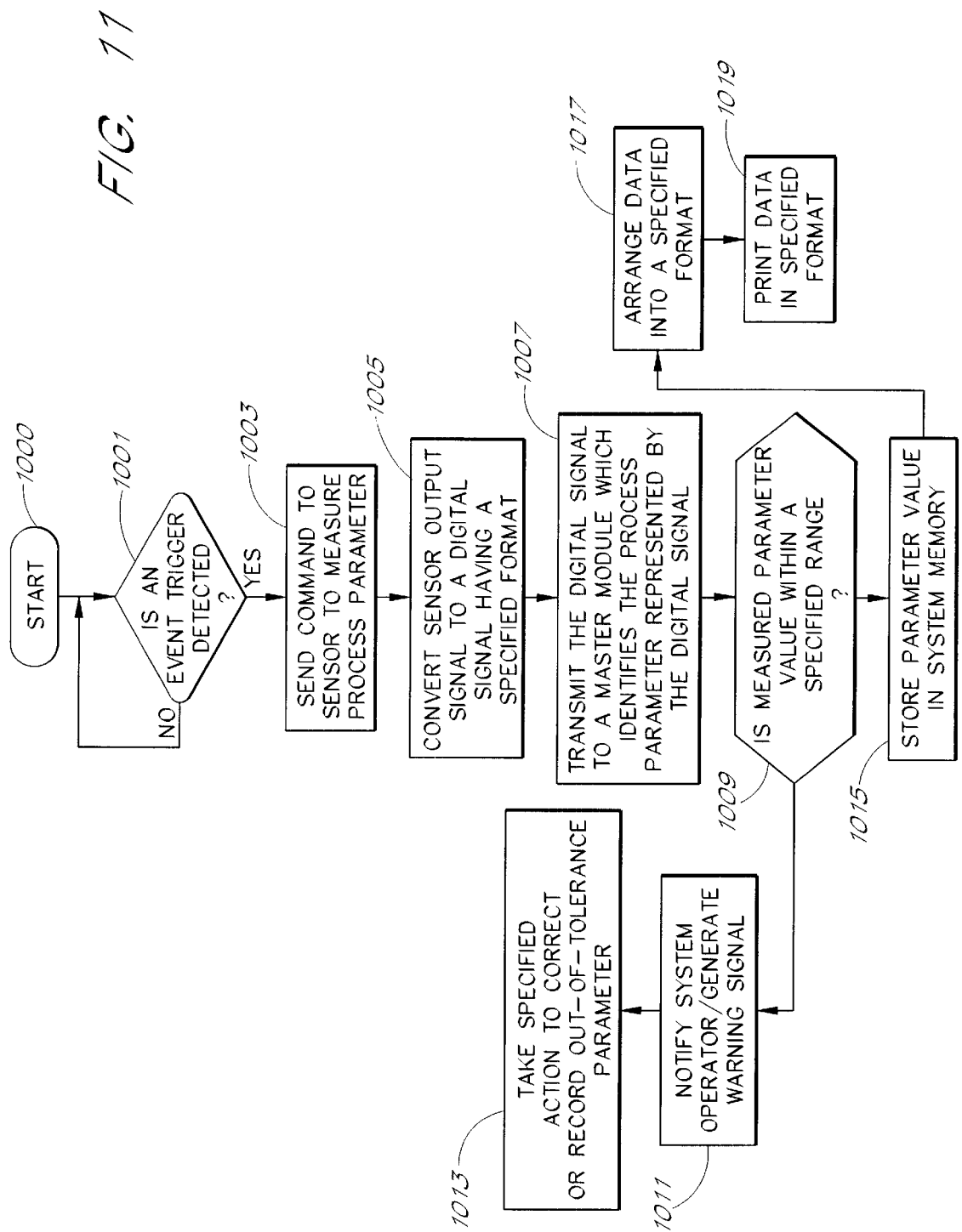
FIG. 11 is a functional block diagram of one embodiment of a monitoring process in accordance with the invention.

FIG. 11 illustrates a flowchart diagram of one embodiment of a process in which a specified parameter is measured, transmitted to the SPCIS and stored within a database of the SPCIS. The process begins at step 1000 and proceeds to step 1001 in which a determination is made as to whether an event trigger has been detected. Typically, as discussed above, an event trigger is transmitted by a proximity sensor to the master module 707 (FIG. 10). However, it is contemplated within the scope of the invention that other methods and systems, such as bar code readers, radio frequency identification (RFID) tags, etc., may be used to transmit an event signal. The proximity sensor detects the presence of a PCB entering a specified stage of the manufacturing process, generates an event trigger signal and transmits it to the master module 707. The query of step 1001 is repeated until an event trigger is detected. If an event trigger is detected in step 1001, the process proceeds to step 1003 wherein a command is sent to a particular sensor to measure a specified process parameter. Next, in step 1005, the measured process parameter value from the sensor is converted into a digital signal having a specified data format. In step 1007, the digital signal is transmitted to a master module 707 of the SPCIS which identifies the process parameter represented by the digital signal. In step 1009, a determination is made as to whether the measured parameter value is within a specified range of acceptable values, which may be stored in a database within the programmable logic controller 713 (FIG. 10). In one embodiment, various ranges of acceptable values may be entered by a system operator during programming of the programmable logic controller 713.

If in step 1009 it is determined that the measured parameter value is not within the specified range, in step 1011, the SPCIS will notify a system operator and/or generate a warning signal so as to indicate that the measured parameter value is not within tolerance. In step 1013, after the SPCIS has notified the system operator and/or generated a warning that a process parameter value is not within a specified tolerance, the SPCIS automatically initiates a specified action to correct and/or record the out-of-tolerance parameter value. This specified action may be in the form of shutting down a respective process machine such that further PCBs are not processed by that particular machine. Or, the SPCIS may simply record the out-of-tolerance parameter value and provide a date and time stamp which corresponds to that value such that an accurate record may be kept as to the specific times in which out-of-tolerance parameter values were measured. Additionally, it is contemplated within the invention that the process parameter itself may automatically be adjusted by controlling a respective control knob, switch, panel, etc. which sets the value of the process parameter. For example, if a temperature reading is below a specified range, the SPCIS can automatically upwardly adjust the temperature setting of the particular machine such that the temperature is adjusted to be within specified tolerance levels.

If in step 1009 the measured parameter values are within the specified range, the process moves to step 1015 in which the parameter value is stored in a system memory. In one embodiment, the system memory is a database within the programmable logic controller 713 (FIG. 7). In step 1017 the data comprising the measured process parameters, are arranged into a specified format. Next, in step 1019, the SPCIS prints the data in the specified format in a hard copy form, e.g., a printed document. In one embodiment, the specified format may be in compliance with quality control standards specified by organizations such as the ISO. This data would show the measured process parameters associated with the manufacture of a particular batch or group of PCBs which are sold to a particular vendor.

The SPCIS Network

The SPCIS 700 (FIG. 10) as described above may be connected to a computer network creating a SPCIS network in which remote users can communicate with the SPCIS 700 by a local area network (LAN), wide area network (WAN) or the global computer communications network, otherwise known as the "Internet." As a result, many remote manufacturing sites are connected to the SPCIS 700 such that data may be transmitted to and received from each of the remote sites by a central processor or server computer which processes and stores the data. Additionally, the SPCIS 700 may be connected to other SPCISs, via one of the above-mentioned digital communications networks such that multiple SPCISs may communicate with each other.

Figure 12:
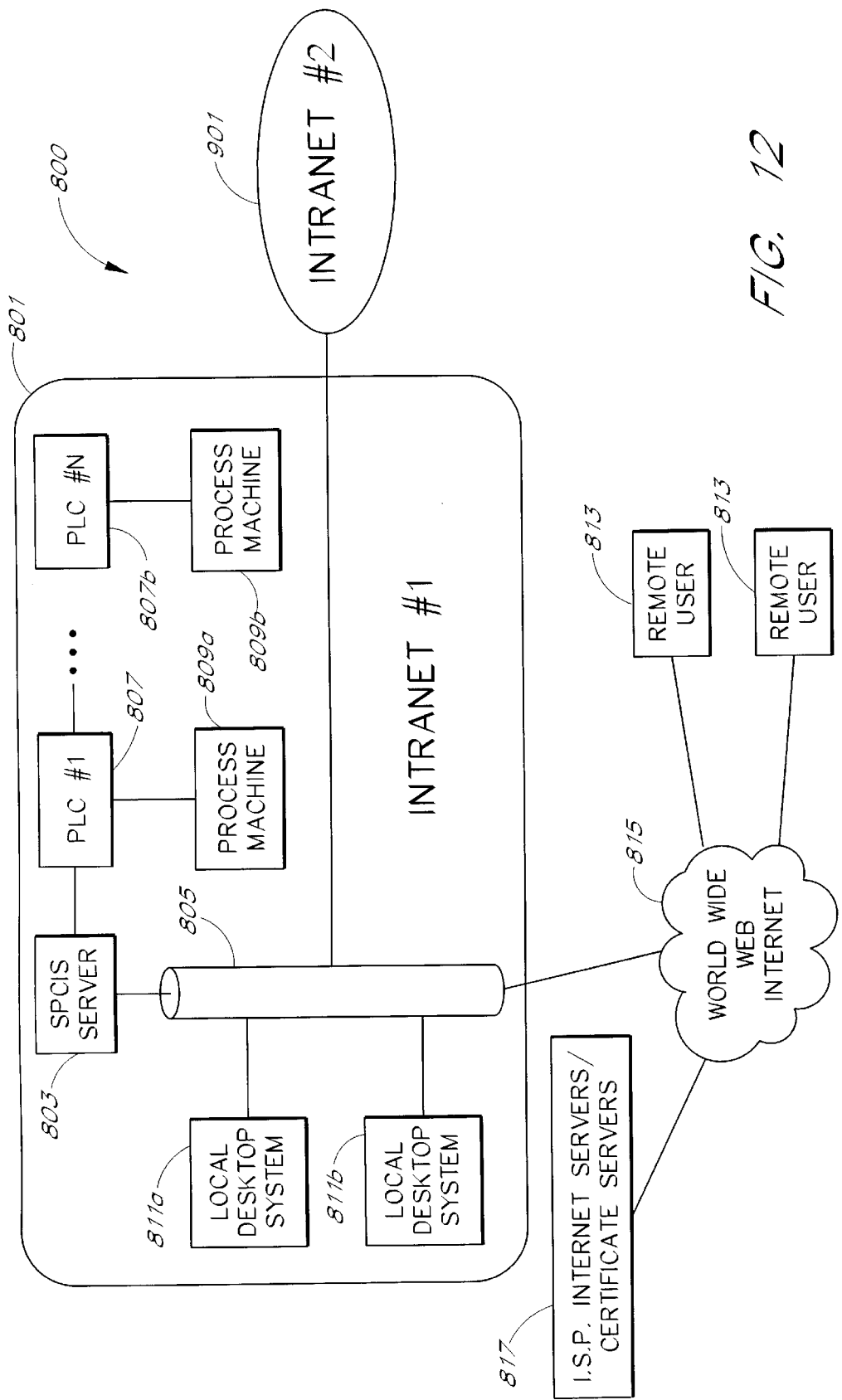
FIG. 12 is a functional diagram of one embodiment of a SPCIS network in accordance with the invention.

Referring to FIG. 12, one embodiment of the SPCIS network 800 is illustrated. In this embodiment, a SPCIS server computer 803 replaces the PC card unit 729 (FIG. 8). The SPCIS network 800 includes at least one SPCIS site 801 having the SPCIS server 803 connected to a local area network (LAN) communications interface 805 which in turn is connected to a LAN line. Electronically coupled to the SPCIS server 803 are multiple programmable logic controllers. For illustrative purposes two programmable logic controllers 807a and 807b are shown in FIG. 12 coupled to the SPCIS server 803. In one embodiment, these programmable logic controllers are coupled to the server 803 in a daisy-chain fashion such that before any data is transmitted to or from a second programmable logic controller 807b, such data passes through the first programmable logic controller 807a. Similarly, the transmission of data to and from any additional programmable logic controllers that are coupled to the SPCIS server 803 in this daisy-chain fashion passes through all intermediate programmable logic controllers. However, it is understood that other coupling configurations may be implemented. For example, each of the programmable logic controllers 807a and 807b may be connected in a parallel fashion to the server 803. Although this parallel configuration typically requires a greater amount of hard wiring, it does allow for parallel processing of data from multiple programmable logic controller by servers 803 capable of handling such loads. Coupled to each of the programmable logic controllers are one or more process machinery 809a, 809b, etc., such as a laminator, photo printer, or wet process machines as described above with respect to FIG. 10. Although not illustrated in FIG. 12, it will be understood that also coupled to each programmable logic controller is the master module 707 (FIG. 8), the programmable terminal 723, and the various sensors and signal converters described above with respect to FIG. 10.

After a programmable logic controller 807a has received data related to various process parameters which are measured by sensors coupled to respective process machinery, the programmable logic controller 807a may either store this data in its own database or transmit all or portions of this data to the SPCIS server 803. This data may then be stored within the SPCIS server 803 and subsequently transmitted to a desktop system, or personal computer 811a, of a local user connected to the LAN interface 805. As shown in FIG. 12, multiple desktop systems, or personal computers 811a, 811b, may be coupled to the LAN interface 805. Through one of these desktop systems, a local user can access data stored at the SPCIS server 803 and also request the server 803 to retrieve data and information from one or more of the programmable logic controllers 807a, 807b coupled to the server 803.

As shown in FIG. 10, the SPCIS site 801 is designated as Intranet #1 and includes the SPCIS server 803 coupled to the LAN interface 805, the plurality of programmable logic controllers 807a, 807b; the process machinery 809a, 809b coupled to respective programmable logic controllers 807a, 807b, and the plurality of desktop systems 811a, 811b, which are also coupled to the LAN interface 805, all of which are shown enclosed within a circle. Typically, and as used herein, the term "intranet" refers to a computer network in which multiple computers which are relatively close in their geographical locations, e.g., within one building or within one campus of a university, are, interconnected via a common communication interface, such as a LAN interface. This intranet system is capable of communicating data between each of the computers in accordance with a communication protocol such as the Ethernet communication protocol. This type of intranet system is also known as a local area network. The intranet system which is depicted by the enclosed circle 801 may become part of a wide area network (WAN) by a connection from its LAN interface 805 to a LAN interface of a second intranet system 901.

Users on a local area network (LAN) can communicate to the SPCIS via their LAN connection. The users may use SPCIS software, which, in one embodiment, is a Visual Basic program developed for a user to communicate with the SPCIS. A user on the LAN network is assigned a unique IP (internet protocol) address. Typically, an IP address is an address assigned to an ethernet unit card as a node in a network. The IP address typically consists of a network number, or a subnet or host number, and consists of 32 bits divided into four segments of 8 bits each. Each of the four segments are separated by a decimal point. The SPCIS system software links up the user's IP address to the SPCIS unique IP address. Once connected, the user is now able to perform any or all of the functions that the SPCIS has to offer as if he or she were physically in the room of the SPCIS.

In order to communicate with an SPCIS at a local site (LAN/Intranet), the user's address, identification is first uploaded from the user's PC, or desktop system to the SPCIS server 803. The following is a list of some of the information which may be loaded into the SPCIS server 803: (1) the IP address for the user's system; (2) a subnet address for the user's system (e.g., the local area network address); (3) the ODI driver path (a communication path used to communicate with other networks); (4) the host file (e.g., contains the address of other SPCIS devices); (5) the conversion table for the IP address and FINS (factory interface network service) node address; (6) the routing table for FINS; and (7) the gateway address for the user's system (the routing address for communicating via the internet). Local SPCISs each include an ethernet card which is connected to a local network hub. The ethernet card serves as a network interface card which handles the protocol to communicate information through the network. The local network hub functions as a common port, which is used to receive and transmit data between multiple users.

In order to communicate with an SPCIS at a remote site (Internet), the user's address, identification is first uploaded from the user's PC, or desktop system to the SPCIS server 803 via an ISP (Internet Service Provider) or a dial-up serial phone line connection (SLIP). The following is a list of some of the information which may be loaded into the SPCIS server 803: (1) the IP address for the user's system; (2) default gateway of ESP router IP address; (3) a certificate key (security access code); (4) a username; and (5) passwords. Remote SPCISs each include a modem and/or a serial communications port that connect to a POTS (telephone company phone line) line. The modem and/or a serial communications port serves as a network interface which handles the protocol to communicate information through the Internet to the SPCIS server 803 on its local area network (LAN). Information is transmitted and received through this port between multiple users and the SPCIS server 803.

In order to view gathered data/information related to the manufacturing parameters being monitored by a SPCIS site 801 having a local area network (LAN) interface 805, a user first logs onto their personal computer (PC), or desktop system 811a or 811b that is also connected to the LAN interface 805. In one embodiment, the PC is compatible with Windows 95 or a 32 bit operating system and includes a network interface adapter (NIC) connected to the LAN. The user then runs an SPCIS software interface program, typically a Visual Basic program, locally on the user's PC which gathers specific information from the SPCIS, through the LAN, as requested by the user.

In one embodiment, the user has available on the PC, graphical user interface (GUI) "objects" that may be selected. These "objects" represent machines that are connected to each of the programmable logic controllers 807 as described above. A "graphical user interface" (GUI) is low-level computer software that exploits the display properties of a cathode ray tube (CRT) or other output device and combines it with a pointing device such as a mouse or joystick to handle graphical input. Color monitors and operating systems that support GUI software have been in use for some 15 years now and are well-documented. Three prominent examples are: Apple's Macintosh System, Microsoft's Windows, and IBM's OS/2.

In one embodiment, when a user selects a particular object, a new window is opened on the user's desktop screen which displays preset process parameters. These preset process parameters are, for example, the temperature setting of the nip rollers of the laminator, the conveyor speed of the conveyor belt which transports a copper panel assembly through an etching chamber, etc. These preset values may also serve as reference values to which measured process parameter values are compared. If a measured process parameter value is not within a specified tolerance, the system can alert an operator, or other personnel or mechanism, that a process parameter is out of tolerance. Such warning may be an auditory warning such as the sounding of an alarm, or a visual warning such as a flashing light or an error message displayed on the screen of a programmable terminal 723 (FIG. 10), for example. After such a warning is given, proper measures can be taken in order to remedy the situation.

Additionally, when a user selects an object corresponding to a particular machine, the actual status of that particular machine may be displayed on the user's desktop screen terminal. In this way, a user at a local desktop system can send commands to the SPCIS server via the LAN line and retrieve data which is specific to a particular process or machine. Conversely, the user can also send commands to a particular machine in order to conduct monitoring functions of process parameters related to that particular machine. Therefore, through connection through the LAN line and the SPCIS server, a user at a local desktop system may monitor a remotely located PCB manufacturing process, or a portion of the process, as if that user were physically present in the room where the process machinery is located.

In addition to displaying real-time measured process parameters and the status of a particular machine or machines coupled to the SPCIS via the Visual Basic program, the SPCIS server 803 may also serve as an archiving system for storing data/information related to the manufacturing process. For example, the SPCIS archiving system can store all measured process parameters in a database, and associate these measured process parameters with a particular time and/or date stamp, a job stamp or organize and store the process parameters in a specified format dictated by the International Standardization Organization (ISO), for example.

Use of the Internet to Connect Remote Users of the SPCIS

Remote users transmit and receive data from the SPCIS server 803 through the use of a digital communications network. Such networks include the Internet, the intranet, local area network, or a wide area network. As shown in FIG. 12, two remote users 813 are connected to the LAN interface 805 via an Internet connection referred to as the World Wide Web 815. Also connected to the local area network 801 via the Internet 815 is an ISP Internet certificate server 817.

An important feature of the present invention is that remote users may monitor process variables associated with a PCB manufacturing process by running a SPCIS software program on their desktop system, or personal computer, which allow them to access and communicate with the server 803 via the internet. A detailed description of using the Internet for this invention is described below.

Once a remote user 813 has logged on to his or her PC and is connected to an SPCIS site via the Internet, the user may then run an SPCIS software interface program, typically a Visual Basic program, at the user's PC. Data transfer between the remote user and the SPCIS site may either be secure (i.e., private) or non-secure (i.e., public). A non-secure, or public, connection between a remote user and a SPCIS site means that data is transferred between the remote user and the SPCIS site such that any user who knows the Internet address of the SPCIS site may obtain this nonsecure information. In secure transmissions, the data which is transmitted between the SPCIS site and a remote user is typically encrypted. It is appreciated that many companies would desire that a record of measured process parameters under which their PCBs are manufactured be private and accessible only by select personnel or authorized remote users. In such an environment, any encryption method which is well-known in the art may be utilized to secure transmissions between an SPCIS site and either a local or remote user connected to the SPCIS site via a LAN/WAN interface or the Internet.

In one embodiment, in order to provide secure transmissions of data between the SPCIS server 805 and a remote operator, an ISP Internet certificate server 817 is provided. The certificate server 817 is coupled to the Internet 815 and provides authentication certificates or codes for each remote terminal and/or user which is authorized to access the data collected by the SPCIS server 803. This certificate may be in the form of either a 64 bit or 128 bit key issued to a particular computer terminal, an individual and/or a company. However, other types of certificates, or encryption methods or securing methods which are well known in the art may be used in accordance with the invention.

After a user has gained access to the SPCIS server 803, he or she may then obtain information and/or send commands to the server 803 in order to obtain specified parameter values. As described above, the user may select an object corresponding to a particular machine, and receive information pertaining to that machine. Additionally, the actual status of that particular machine may be displayed on the user's desktop screen terminal. In this way, a user at a local or remote desktop system can send commands to the SPCIS server and retrieve data which is specific to a particular process or machine. Furthermore, the user can also send commands to a particular machine in order to conduct monitoring functions of process parameters related to that particular machine. Therefore, through a connection to the SPCIS server, via the LAN or the internet, a user at a local or remote desktop system may monitor a PCB manufacturing process, or a portion of the process, as if that user were physically present in the room where the process machinery is located.

The Internet

The Internet currently connects about 50,000 computer networks, which in turn connect about 5 million computers, which serve an estimated 50 million users. The Internet connects many diverse networks of many different computer hardware/software makes, versions, formats, codes, and protocols. There is no single "operating system" for the Internet, but there are various widely used file formatting, site locating, message routing, and display encoding standards. To participate on the Internet, a host computer's operating system must acquire and use Internet-smart software, which is widely available commercially.

The Internet enables otherwise incompatible hardware and software, by extending the file name with prefixes that identify the protocol (and other things) that apply to the file. For example, many Internet filenames begin with "http://", which indicates that this file should be handled by software that understands the Hyper Text Transfer Protocol (HTTP), a program that knows how to follow embedded pointers or "links" to files on other Internet computers.

One way to use the Internet is as an access mechanism for running programs on a remote host computer. Instead of dialing in from a telephone, the user dials in via the Internet. All of the application data and processes are stored and manipulated on the host computer. The Internet serves only to transmit the user keystrokes and mouse clicks to the host, and to return the host computer output to the user computer.

On the Internet, remote login is supported by Telnet and rlogin protocols. These use a simple command line protocol familiar to those who have ever used DOS on a PC. They are available in UNIX versions as well as for GUI-oriented systems such as Windows 3.1, Windows NT, Windows 95, JAVA, and other well known GUI based systems.

To transmit text in readable form, the Internet software begins with ASCII code and "marks it up" with special codes to indicate special text handling such as bold, underlining, colors and fonts, and so on. The ASCII (American Standard Code for Information Interchange) code assigns a unique number to every letter, digit, punctuation mark, as well as some control actions such as new-line, tab, and end-of-text.

The HTML (Hyper Text Markup Language) adds text treatment instructions. For example, to display a word in some emphasized manner, HTML may encode it as follows:

The quick <EM> brown </EM> fox jumps over the lazy dog The local display software detects the <EM> tags and substitutes some emphasizing action so that on the local screen the text may appear as The quick brown fox jumps over the lazy dog HTML provides a way for a sender to convey commands to the receiver. For example, the tag <EM> above really commands the receiving software to emphasize a portion of the text. In other uses, other tags could command the receiving software to do special SPCIS-oriented functions such as table lookup, access to a specified set of recorded parameter values or display of special graphics. In this manner, HTML (or some modified version of it) can be used as a batch language to transmit commands from the central SPCIS server computer 803 to the remote user's computer.

After a sending computer transmits data over the Internet to a receiving computer, no further interaction is normally required or expected between the two computers. After loading the data, the sending software can go on to handle other requests. However, to engage in a two-way conversation with the remote user, the user's response must be handled. This is done by Internet software using a special protocol called CGI (Common Gateway Interface). Using CGI, when the user clicks a hypertext field in an HTML file, or fills in a HTML "form", the Internet software sends a "reply" back to the original sender, where it is intercepted and handled by a CGI program. The CGI concept is to insert a software step that "catches" user responses and processes them. The CGI protocol supports two-way communication between the remote computers via the Internet, and supports the storing of session-specific data between sessions. This preserves the "state" of the communication, so that a continuous dialog can be generated.

The Java concept is an example of a software mechanism for attaching executable processes to the HTML page, transmitting them, and then running them on the receiving computer. Whereas CGI-invoked programs run on the sender's computer and are "blind" to the capabilities of the remote receiver's machine, the Java approach essentially permits both data and programs to be transmitted across the Internet. The HTML programmer basically writes application source code in Java and appends it to the HTML page. When the user's browser displays the HTML page on the user's computer, it executes (actually "interprets") the Java code and handles the input/output to the user. Since the browser is written for the user's computer, it "knows" the user's system, and can take full advantage of this fact.

The Java concept is merely an illustration of the concept of transmitting programs to the receiver. In fact, any executable software can be appended to the HTML page, provided the receiver knows how to read and interpret or execute it. Any number of other codes and languages can be used to do this for the SPCIS network 800.

In order to view data/information related to manufacturing parameters being monitored at a SPCIS site connected to the Internet, a remote user 813 must first log onto his or her computer or PC which is connected to the Internet. In one embodiment, the user's PC may be compatible with Windows 95 or a 32-bit operating system. The PC may also include a network interface adapter (NIA) connected to a local area network, or a modem connected to an Internet Service Provider (ISP) which provides access to the Internet.

SUMMARY

As described above, the invention provides a method and system for automatically monitoring and validating, in real-time, desired process parameters related to the manufacturing process of printed circuit boards. The invention provides a statistical process control integration system (SPCIS) in which monitored machinery associated with the manufacturing process are coupled to a central controller which receives measured process parameters and stores this data. The controller may also run the protocol for data measurement and transmission from each piece of machinery to the controller. The measured process parameters may also serve as certifiable data which can be systematically downloaded into a text or other suitable format approved by the International Standardization Organization (ISO), for example, for quality assurance certification. In one embodiment, the SPCIS of the invention also allows the measured parameters to be stored in a memory such that historical information related to the manufacturing process may be saved. Additionally, in one embodiment, the SPCIS notifies manufacturing and/or engineering personnel of pending problems, or lack thereof, on a real-time basis, or on a substantially real-time basis.

The invention also provides a method and system, or network, for interconnecting multiple, remotely located, PCB manufacturing sites such that these remotely located processes may be monitored in a coordinated fashion. By utilizing computer-based networks such as a local area network (LAN) and/or a wide area network (WAN), or the global computer information network, otherwise known as the "Internet," a system operator at a remote location can access an SPCIS server computer and perform monitoring functions as if that system operator were physically in the room where the SPCIS monitoring equipment are located. Therefore, the invention also provides an automatic and computerized system which can electronically link multiple remote sites in order to efficiently monitor process parameters at each of the remote sites and correlate the measured data such that an accurate record of manufacturing conditions for each PCB, or batch of PCBs, can be maintained.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A statistical process control integration system for monitoring and storing certifiable manufacturing process parameters associated with the manufacture of printed circuit board (PCB) manufacturing processes in use at multiple, geographically separate manufacturing sites comprising:

a preclean/scrubbing system at each of said manufacturing sites through which a copper panel is transported;

a proximity sensor for detecting a copper panel passing through said preclean/scrubbing system and generating a trigger signal;

a laminator at each of said manufacturing sites which laminates a sheet of resist onto a surface of said copper panel;

a photoprinter at each of said manufacturing sites which exposes select portions of said resist to light, thereby polymerizing the exposed portions of the resist, wherein the photoprinter includes a vacuum chamber;

a developing machine at each of said manufacturing sites for removing select portions of said resist from a copper panel, wherein the developing machine includes a developing chamber and a pressurized nozzle located inside the developing chamber for spraying a developing solution onto the resist;

an etching machine at each of said manufacturing sites for removing select portions of said copper panel, wherein the etching machine includes an etching chamber and a pressurized nozzle located within the etching chamber for spraying an etchant solution on the copper panel;

a stripping machine at each of said manufacturing sites for stripping resist from said copper panel, wherein the stripping machine includes a stripping chamber and a pressurized nozzle located within the stripping chamber for spraying a stripping solution onto the resist and the copper panel;

at least one sensing device coupled to each laminator, photoprinters, developing machine, etching machine and stripping machine, each such device measuring a controllable process parameter associated with the PCB manufacturing process at the manufacturing site in which said sensing device is located;

signal converters at each manufacturing site coupled to each of the sensing devices at each site to convert the output of each sensor to digital signal having a specified data format;

a digital communications network coupled to each of said signal converters;

a monitor located at a site geographically remote from at least one of said manufacturing sites and coupled to said digital communications network, said monitor, upon receipt and identification of said trigger signal, initiating a data gathering protocol for said manufacturing site, said monitor storing preset process parameters and comparing said preset values with the digital signal received from said signal converters and automatically calculating when a measured process parameter is not within a specified tolerance and providing a readout alerting an out-of-tolerance parameter; and a recorder coupled to said monitor for storing certifiable manufacturing parameters received from each of said manufacturing sites including sites geographically remote from said monitor.

2. A statistical process control integration system for monitoring and storing certifiable manufacturing process parameters associated with the manufacture of printed circuit board (PCB) manufacturing processes in use at multiple, geographically separate manufacturing sites comprising:

a laminator at each of said manufacturing sites which laminates a sheet of resist onto a surface of a copper panel;

a photoprinter at each of said manufacturing sites which exposes select portions of said resist to light, thereby polymerizing the exposed portions of the resist, wherein the photoprinter includes a vacuum chamber;

a developing machine at each of said manufacturing sites for removing select portions so said resist from a copper panel, wherein the developing machine includes a developing chamber and a pressurized nozzle located inside the developing chamber for spraying a developing solution onto the resist;

an etching machine at each of said manufacturing sites for removing select portions of said copper panel, wherein the etching machine includes an etching chamber and a pressurized nozzle located within the etching chamber for spraying an etchant solution on the copper panel;

a stripping machine at each of said manufacturing sites for stripping resist from said copper panel, wherein the stripping machine includes a stripping chamber and a pressurized nozzle located within the stripping chamber for spraying a stripping solution onto the resist and the copper panel;

at least one sensing device coupled to each laminator, photoprinter, developing machine, etching machine and stripping machine, each such device measuring a controllable process parameter associated with the PCB manufacturing process at the manufacturing site in which said sensing device is located;

signal converters at each manufacturing site coupled to each of the sensing devices at each site to convert the output of each sensor to a digital signal having a specified data format;

a digital communications network coupled to each of said signal converters;

a monitor located at a site geographically remote from at least one of said manufacturing sites, said monitor storing preset process parameters and comparing said preset values with the digital signal received from said signal converters and automatically calculating when a measured process parameter is not within a specified tolerance and providing a readout alerting an out-of-tolerance parameter, and a recorder compiled to said monitor for storing certifiable manufacturing parameters received from each of said manufacturing sites including sites geographically remote from said monitor.

3. A statistical process control integration system for monitoring and storing certifiable manufacturing process parameters associated with the manufacture of printed circuit board (PCB) manufacturing processes in use at multiple, geographically separate manufacturing sites comprising:

a laminator at each of said manufacturing sites which laminates a sheet of resist onto a surface of a copper panel;

at least one laminator sensor coupled to each laminator, for measuring a lamination process parameter and converting a measured value of the lamination process parameter into a first signal;

a photoprinter at each of said manufacturing sites which exposes select portions of said resist to light, thereby polymerizing the exposed portions of the resist, wherein the photoprinter includes a vacuum chamber;

at least one photoprinter sensor coupled to each photoprinter, for measuring a photoprinting process parameter and converting a measured value of the photoprinting process parameter into a second signal; and a developing machine at each of said manufacturing sites for removing select portions so said resist from a copper panel, wherein the developing machine includes a developing chamber and a pressurized nozzle located inside the developing chamber for spraying a developing solution onto the resist;

at least one developer sensor coupled to each developing machine, for measuring a developer process parameter and converting a measured value of the developer process parameter into a third signal; and an etching machine at each of said manufacturing sites for removing select portions of said copper panel, wherein the etching machine includes an etching chamber and a pressurized nozzle located within the etching chamber for spraying an etchant solution on the copper panel;

at least one etching sensor coupled to each etching machine, for measuring an etching process parameter and converting a measured value of the etching process parameter into a fourth signal; and a stripping machine at each of said manufacturing sites for stripping resist from said copper panel, wherein the stripping machine includes a stripping chamber and a pressurized nozzle located within the stripping chamber for spraying a stripping solution onto the resist and the copper panel;

at least one stripping sensor coupled to each stripping machine, for measuring a stripping process parameter and converting a measured value of the stripping process parameter into a fifth signal; and signal converters at each manufacturing site respectively coupled to each of the sensing devices at each site to respectively convert said first, second, third, fourth and fifth signals into first, second, third, fourth and fifth digital signals having a specified data format;

a digital communications network coupled to each of said signal converters;

a monitor located at a site geographically remote from at least one of said manufacturing sites, said monitor storing preset process parameters and respectively comparing said preset values with said first, second, third, fourth and fifth digital signals received from said signal converters and automatically calculating when a measured process parameter is not within a specified tolerance and providing a readout alerting an out-of-tolerance parameter; and a recorder compiled to said monitor for storing certifiable manufacturing parameters received from each of said manufacturing sites including sites geographically remote from said monitor.

* * * * *